United States Patent
Huang et al.

(10) Patent No.: US 12,259,752 B1
(45) Date of Patent: Mar. 25, 2025

(54) CASE WITH SEGMENTED CRADLE ASSEMBLY FOR A MOBILE COMMUNICATIONS DEVICE

(71) Applicant: World Richman Manufacturing Corporation, Elgin, IL (US)

(72) Inventors: David Huang, Elgin, IL (US); Michael Liu, FoShan (CN)

(73) Assignee: World Richman Manufacturing Corporation, Elgin, IL (US)

( * ) Notice: Subject to any disclaimer, the term of this patent is extended or adjusted under 35 U.S.C. 154(b) by 0 days.

(21) Appl. No.: 18/805,409

(22) Filed: Aug. 14, 2024

Related U.S. Application Data

(60) Provisional application No. 63/574,620, filed on Apr. 4, 2024.

(51) Int. Cl.
| | |
|---|---|
| *G06F 1/16* | (2006.01) |
| *H04B 1/3877* | (2015.01) |
| *H04B 1/3888* | (2015.01) |
| *H04M 1/04* | (2006.01) |

(52) U.S. Cl.
CPC ......... *G06F 1/1626* (2013.01); *H04B 1/3877* (2013.01); *H04B 1/3888* (2013.01); *H04M 1/04* (2013.01)

(58) Field of Classification Search
CPC ..... G06F 1/1626; G06F 1/1628; G06F 1/1632
See application file for complete search history.

(56) References Cited

U.S. PATENT DOCUMENTS

| | | | | |
|---|---|---|---|---|
| 9,496,102 | B2* | 11/2016 | Bates | H01H 13/86 |
| 9,634,711 | B2* | 4/2017 | Sirichai | A45C 11/00 |
| D991,936 | S * | 7/2023 | Cheng | D14/440 |
| 11,871,821 | B2* | 1/2024 | Courter | A45C 11/00 |
| 2011/0297566 | A1* | 12/2011 | Gallagher | F16M 11/2021 |
| | | | | 206/320 |
| 2015/0108186 | A1* | 4/2015 | Law | G03B 17/56 |
| | | | | 224/191 |
| 2016/0161988 | A1* | 6/2016 | Reymond | G06F 1/1626 |
| | | | | 455/575.8 |
| 2016/0233911 | A1* | 8/2016 | Sirichai | G06F 1/182 |
| 2017/0237843 | A1* | 8/2017 | Ackeret | B60R 11/0252 |
| | | | | 455/575.9 |

* cited by examiner

*Primary Examiner* — Anthony Q Edwards
(74) *Attorney, Agent, or Firm* — Christopher J. Scott

(57) ABSTRACT

A case assembly selectively encases and displays a mobile communications device. The case assembly includes or incorporates a segmented cradle assembly configured to adjustably cradle variously sized mobile communications devices. The segmented cradle assembly includes an anterior panel, a posterior panel, and a plurality of device-holding cradle segments. Each device-holding cradle segment includes a panel-opposing portion and a device-cradling portion. The anterior panel is spaced from the posterior panel, and the panel-opposing portions are loosely sandwiched intermediate the anterior panel and the posterior panel. The panel-opposing portions are further attached to the panels by way of an elastic tether member. The cradle segments are displaceable relative to the panels and to one another via the elastic tether members for varying a distance between the device-holding cradle segments thereby being adjustable for receiving and cradling variously sized mobile communications devices.

17 Claims, 26 Drawing Sheets

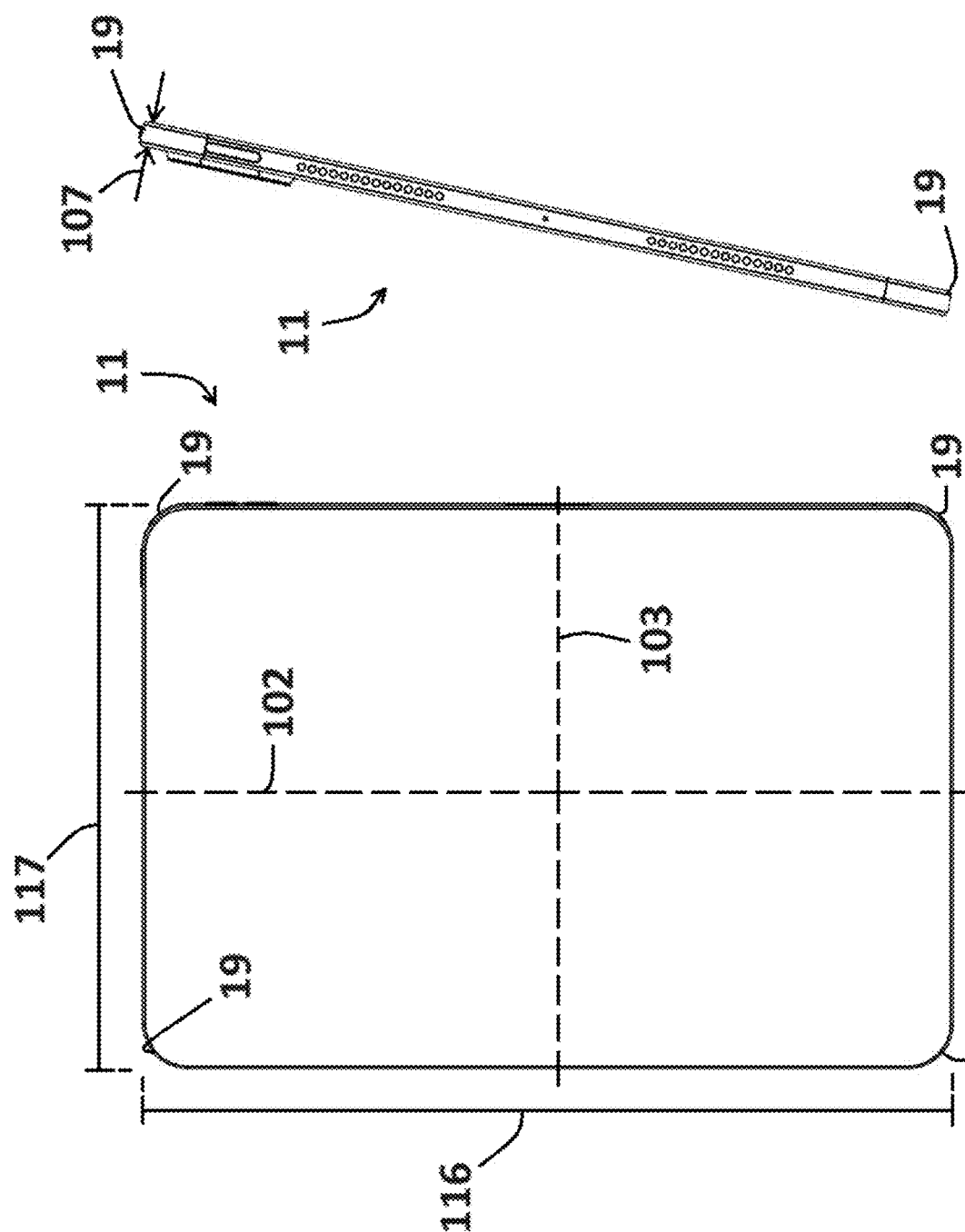

CASE WITH SEGMENTED CRADLE ASSEMBLY FOR A MOBILE COMMUNICATIONS DEVICE

This application claims the benefit of U.S. Provisional Patent Application No. 63/574,620 filed in the United States Patent and Trademark Office (USPTO) on 4 Apr. 2024, the specifications and drawings of which are hereby incorporated by reference thereto.

FIELD OF THE INVENTION

The present invention generally relates to a case and cradle assembly for use with a mobile communications device. More particularly, the present invention relates to a case with size-adjustable segmented cradle assembly for outfitting variously sized mobile communications devices.

SUMMARY OF THE INVENTION

The present invention essentially provides a case assembly with incorporated segmented cradle assembly for a mobile communications device exemplified by a smart phone or tablet type computer. There is provided in accordance with one aspect or embodiment of the presently disclosed subject matter a case assembly for encasing and selectively displaying a mobile communications device.

In some embodiments, the case assembly comprises a segmented cradle assembly configured to adjustably cradle variously sized mobile communications devices. In some embodiments, the segmented cradle assembly comprises a centralized panel arrangement comprising an anterior panel and a posterior panel. The anterior and posterior panels are arranged in parallel relation to one another in some embodiments.

The segmented cradle assembly further comprises a plurality of device-holding cradle segments. Each device-holding cradle segment comprises a panel-opposing portion and a device-cradling portion in some embodiments. The anterior panel is spaced from the posterior panel, and the panel-opposing portions are loosely sandwiched or displaceably received intermediate the anterior panel and the posterior panel.

The device-holding cradle segments are attached to the anterior panel and posterior panel by way of an elastic tether member in some embodiments. The device-holding segments are displaceable relative to the anterior panel and posterior panel and to one another via the elastic tether members for varying a distance between the device-holding cradle segments and for adjustably receiving and cradling variously sized mobile communications devices.

In some embodiments, the device-holding cradle segments are displaceable relative to one another for adjusting at least one of a cradle length and a cradle width of the segmented cradle assembly. In some embodiments, the segmented cradle assembly comprises at least four device-holding cradle segments such that the at least four device-holding cradle segments are positioned at four corner positions for respectively cradling four respective corners of a mobile communications device.

In some embodiments, the device-holding cradle segments are displaceable along displacement axes extending obliquely relative to the cradle length and the cradle width. In some embodiments, at least two adjacent device-holding cradle segments are elastically tethered to one another for enhancing securement of the two adjacent device-holding cradle segments to the mobile communications device.

In some embodiments, each device-holding cradle segment comprises an outer anterior cradle surface and an inner anterior cradle surface. In some embodiments, the inner anterior cradle surfaces are offset from the outer anterior cradle surfaces such that the anterior panel extends into an offset space defined by each device-holding cradle segment.

In some embodiments, the anterior panel comprises an anterior panel surface. The anterior panel surface and the outer anterior cradle surfaces are coplanar in some embodiments. In some embodiments, the outer anterior cradle surfaces are grooved and the inner anterior cradle surfaces are smooth. In some embodiments, the elastic tether members are anchored to the device-holding cradle segments such that anchor ends of the elastic tether members are flush with the posterior cradle surfaces of the device-holding cradle segments.

In some embodiments, an outer folio selectively encases and/or displays the segmented cradle assembly. In some embodiments, the posterior panel is attached to the outer folio assembly at an attachment panel portion of the outer folio assembly. In some embodiments, the outer folio assembly comprises a cavitied panel section in adjacency to the attachment panel portion. The cavitied panel section comprises a panel-receiving cavity configured to receive the a posterior panel portion when the outer folio assembly encases the cradle assembly.

There is provided in accordance with another aspect or embodiment of the presently disclosed subject matter a segmented cradle assembly for adjustably cradling variously sized mobile communications devices. The segmented cradle assembly comprises a centralized segment-anchoring arrangement and a plurality of device-holding cradle segments.

Each device-holding cradle segment comprises an arrangement-opposing portion or panel-opposing portion. The arrangement-opposing portions are adjustably attached to the centralized segment-anchoring arrangement. The arrangement-opposing portions are displaceable relative to the centralized segment-anchoring arrangement and to one another for adjusting a distance between the device-holding cradle segments for cradling variously sized mobile communications devices.

In some embodiments, the centralized segment-anchoring arrangement comprises an anterior panel and a posterior panel. The anterior panel is spaced from the posterior panel, and the arrangement-opposing portions are sandwiched intermediate the anterior panel and the posterior panel. In some embodiments, the device-holding cradle segments are elastically displaceable relative to one another for resiliently adjusting at least one of a cradle length and a cradle width of the segmented cradle assembly.

In some embodiments, at least four device-holding cradle segments are positioned at four corner positions for respectively cradling four respective corners of a mobile communications device. In some embodiments, the device-holding cradle segments are displaceable along displacement axes extending obliquely relative to the cradle length and the cradle width. In some embodiments, at least two adjacent device-holding cradle portions are elastically tethered to one another for enhancing securement of said two adjacent device-holding cradle segments to the mobile communications device.

In some embodiments, the device-holding cradle segments each comprise an outer anterior cradle surface and an inner anterior cradle surface at the arrangement-opposing portion. In some embodiments, the inner anterior cradle surfaces are offset from the outer anterior cradle surfaces such that the anterior panel extends into an offset space defined by each device-holding cradle segment. In some embodiments, the outer anterior cradle surfaces are grooved and the inner anterior cradle surfaces are smooth. In some embodiments, the anterior panel comprises an anterior panel surface such that the anterior panel surface and the outer anterior cradle surfaces are coplanar.

BRIEF DESCRIPTION OF THE DRAWINGS

Other features and objectives of the presently disclosed subject matter will become more evident from a consideration of the following brief descriptions of patent drawings.

FIG. 5 is an anterior plan view of a generic mobile communications device receivable by the segmented cradle assembly according to the presently disclosed subject matter.

FIG. 6 is a lateral edge view of a generic mobile communications device receivable by the segmented cradle assembly according to the presently disclosed subject matter.

DETAILED DESCRIPTION OF THE EMBODIMENTS

Figure 1:
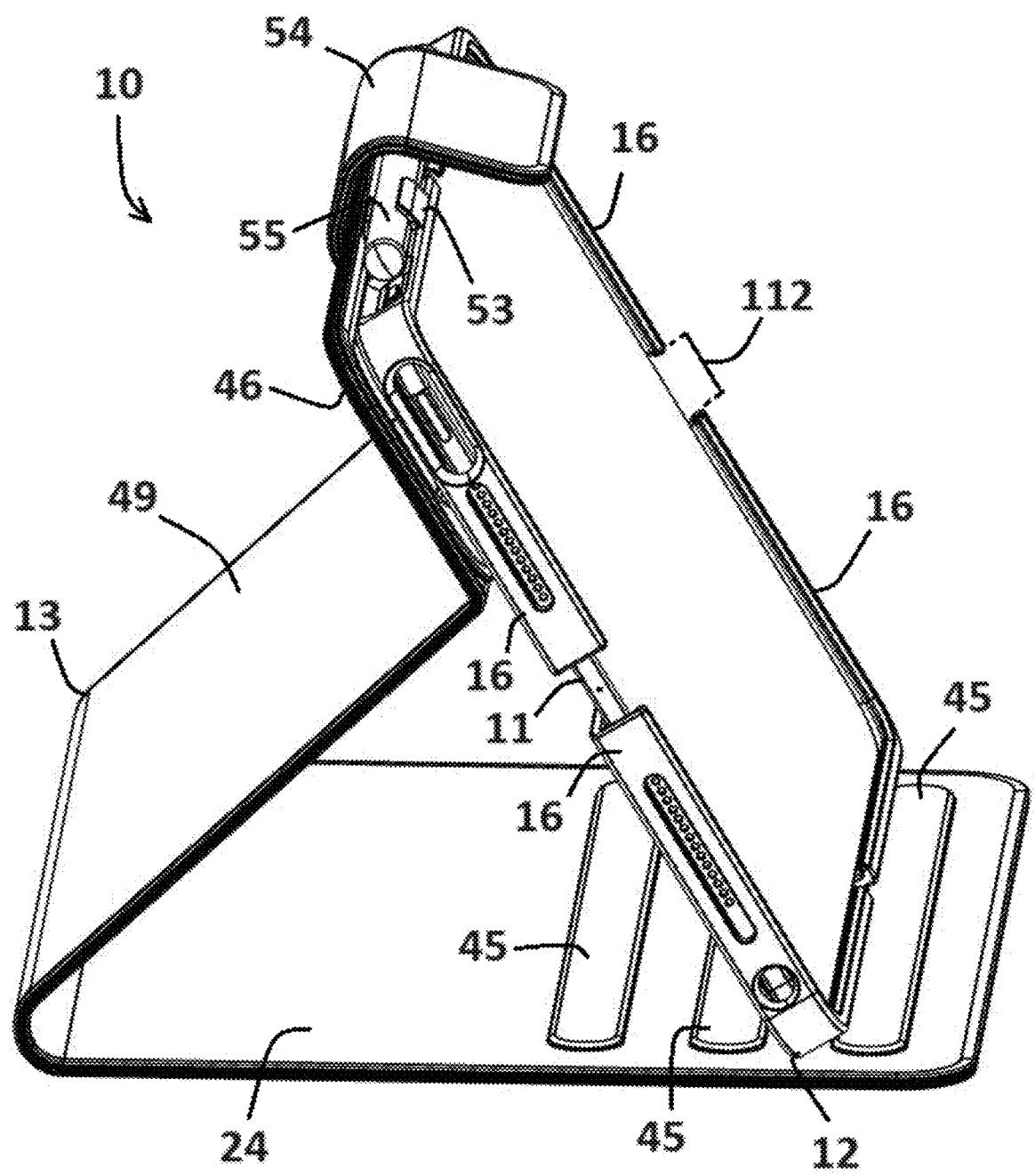
FIG. 1 is an anterior top perspective view of a case assembly according to the presently disclosed subject matter shown in a cradle-support configuration whereby a segmented cradle assembly of the case assembly is cradling a generic mobile communications device.

Referring now to the drawings with more specificity, the presently disclosed subject matter generally a case assembly 10 for selectively encasing and/or displaying a mobile communications device 11 exemplified by a tablet computer or smart phone. The case assembly 10 with a cradled mobile communications device 11 according to the presently disclosed subject matter is introduced and depicted in FIGS. 1 and 2. It will be seen from a comparative inspection of FIGS. 1 and 2 the mobile communications device 11 is received in a cradle assembly as referenced at 12. The cradle assembly 12 is a segmented cradle assembly and hereinafter referred to as such. The segmented cradle assembly 12 is central to the practice of the case assembly 10 according to the presently disclosed subject matter and essentially functions to adjustably cradle variously sized mobile communications devices 11.

Figure 2:
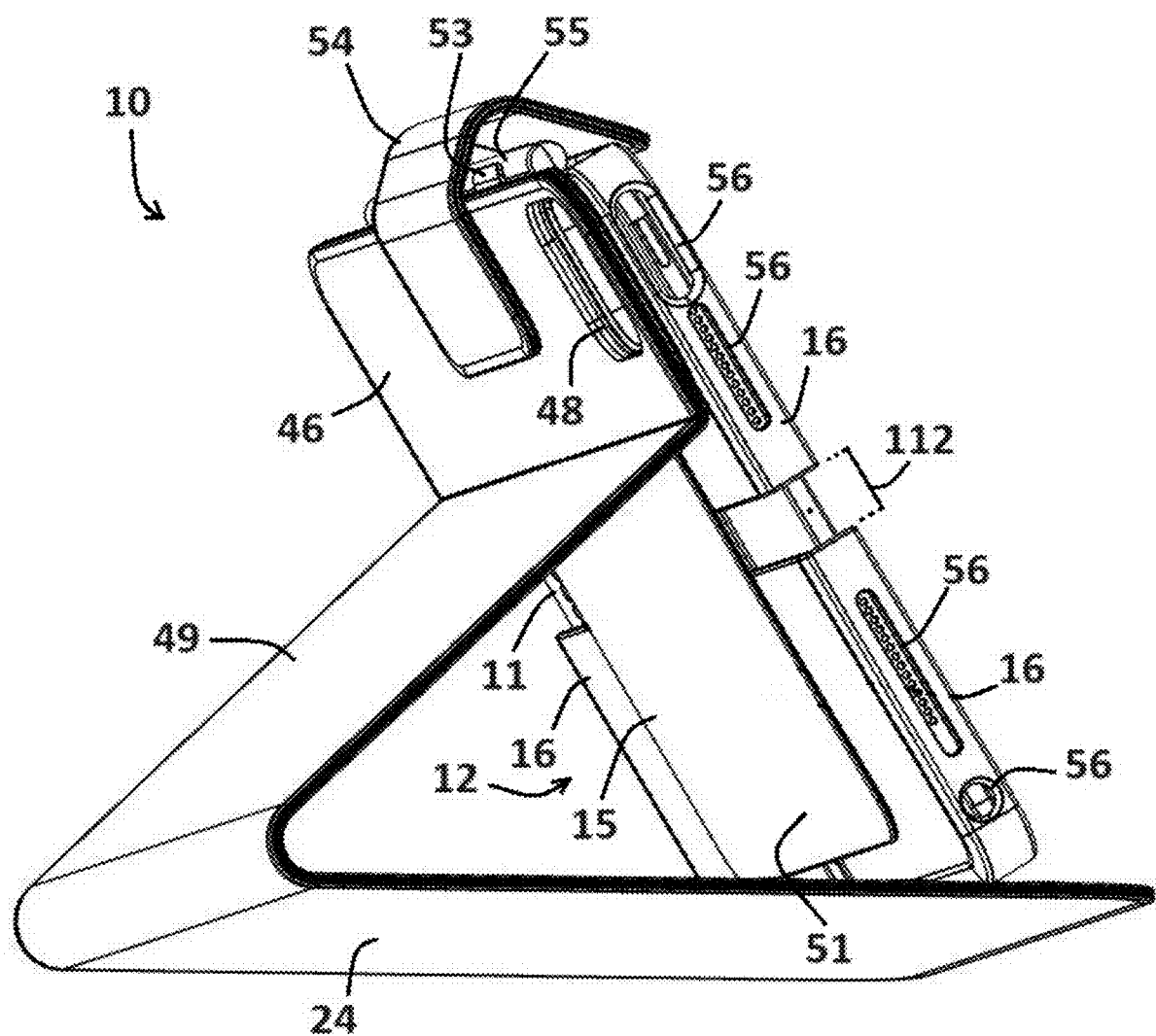
FIG. 2 is a posterior bottom perspective view of the case assembly according to the presently disclosed subject matter shown in the cradle-support configuration otherwise depicted in FIG. 1.
Figure 3:
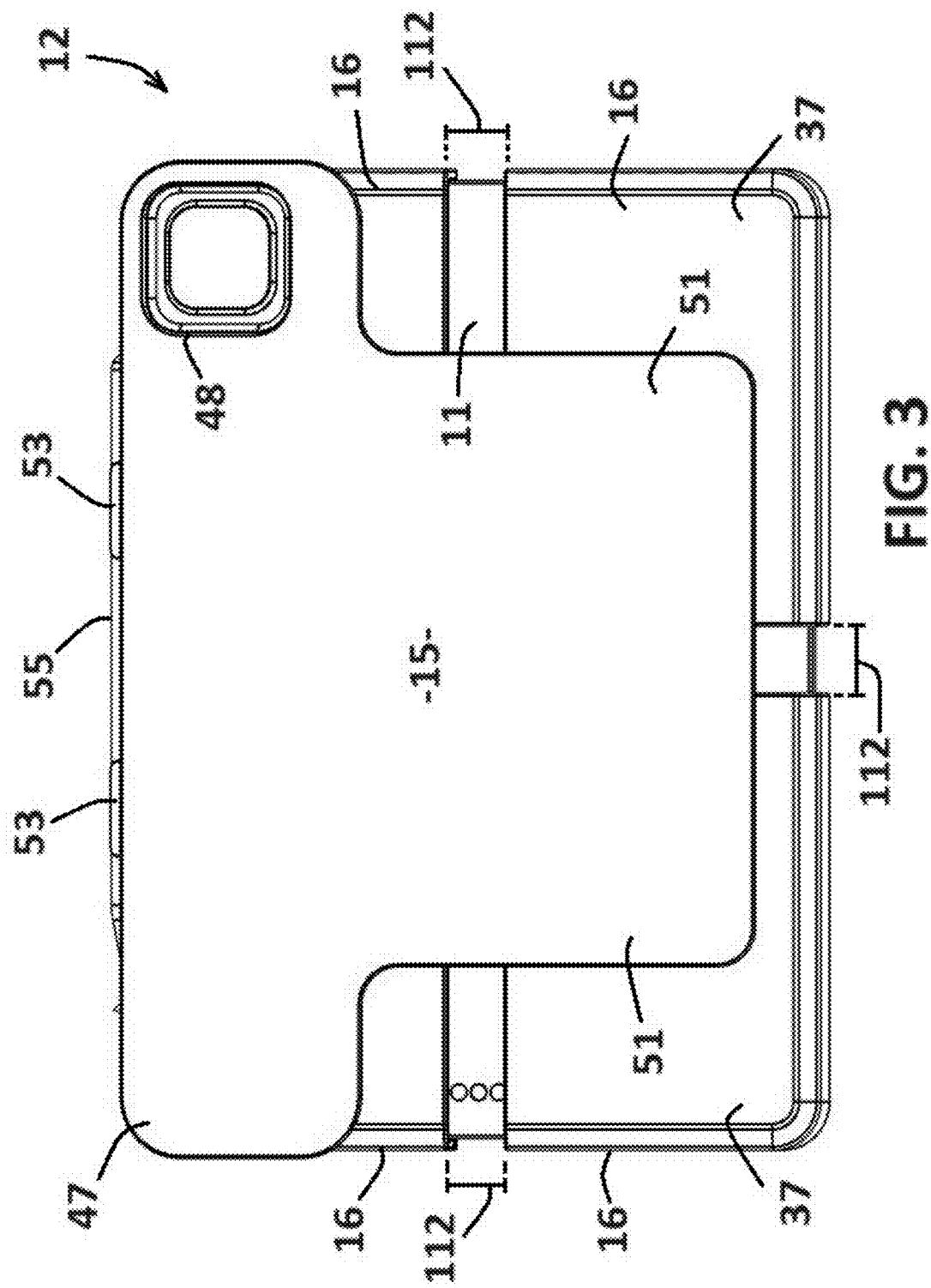
FIG. 3 is a posterior plan view of the segmented cradle assembly according to the presently disclosed subject matter showing a posterior panel and a plurality of device-holding cradle segments cradling a generic mobile communications device.
Figure 4:
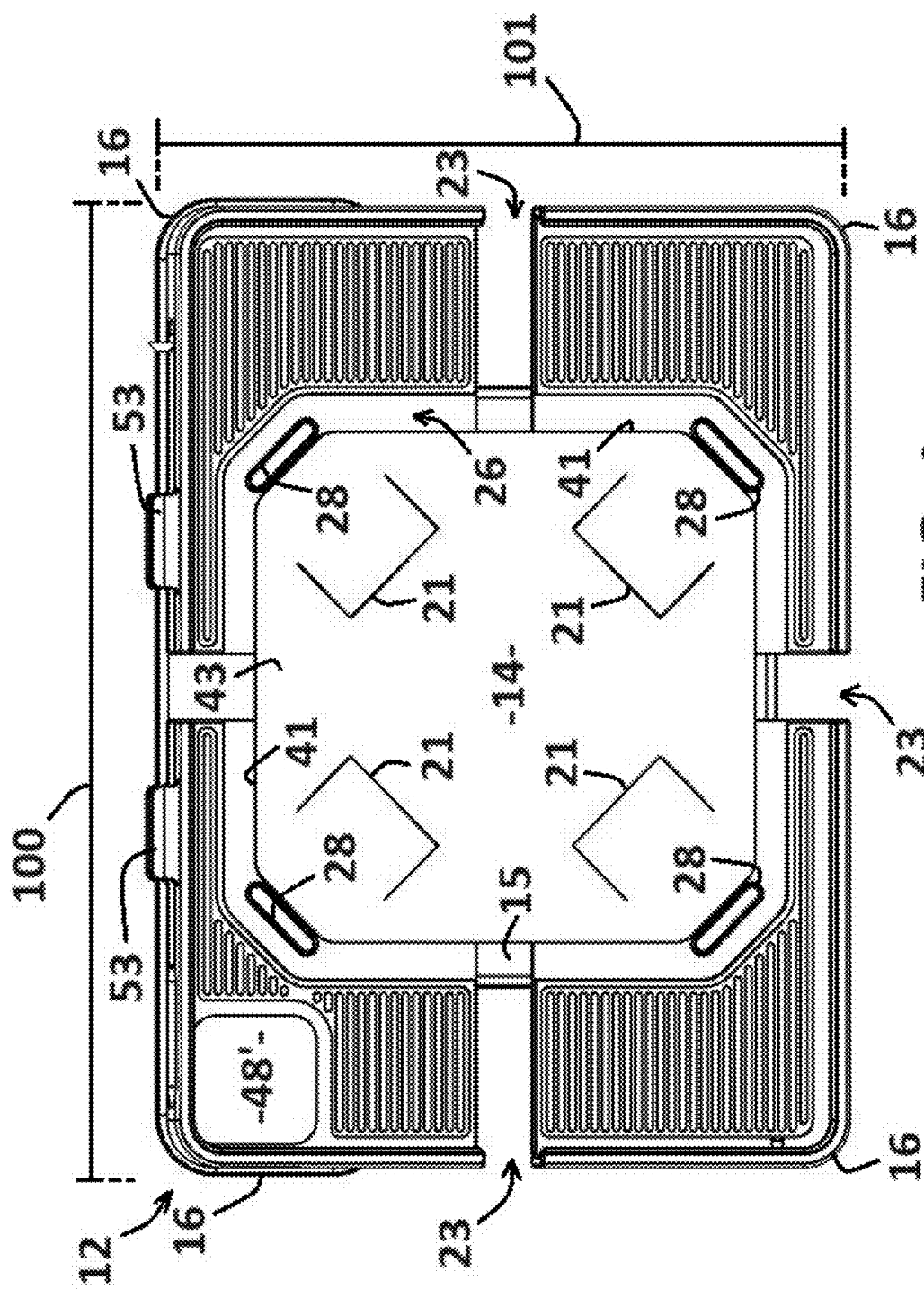
FIG. 4 is an anterior plan view of the segmented cradle assembly according to the presently disclosed subject matter showing a plurality of device-holding cradle segments actuably displaced form a centralized anterior panel thereby forming gaps between adjacent device-holding cradle segments.
Figure 7:
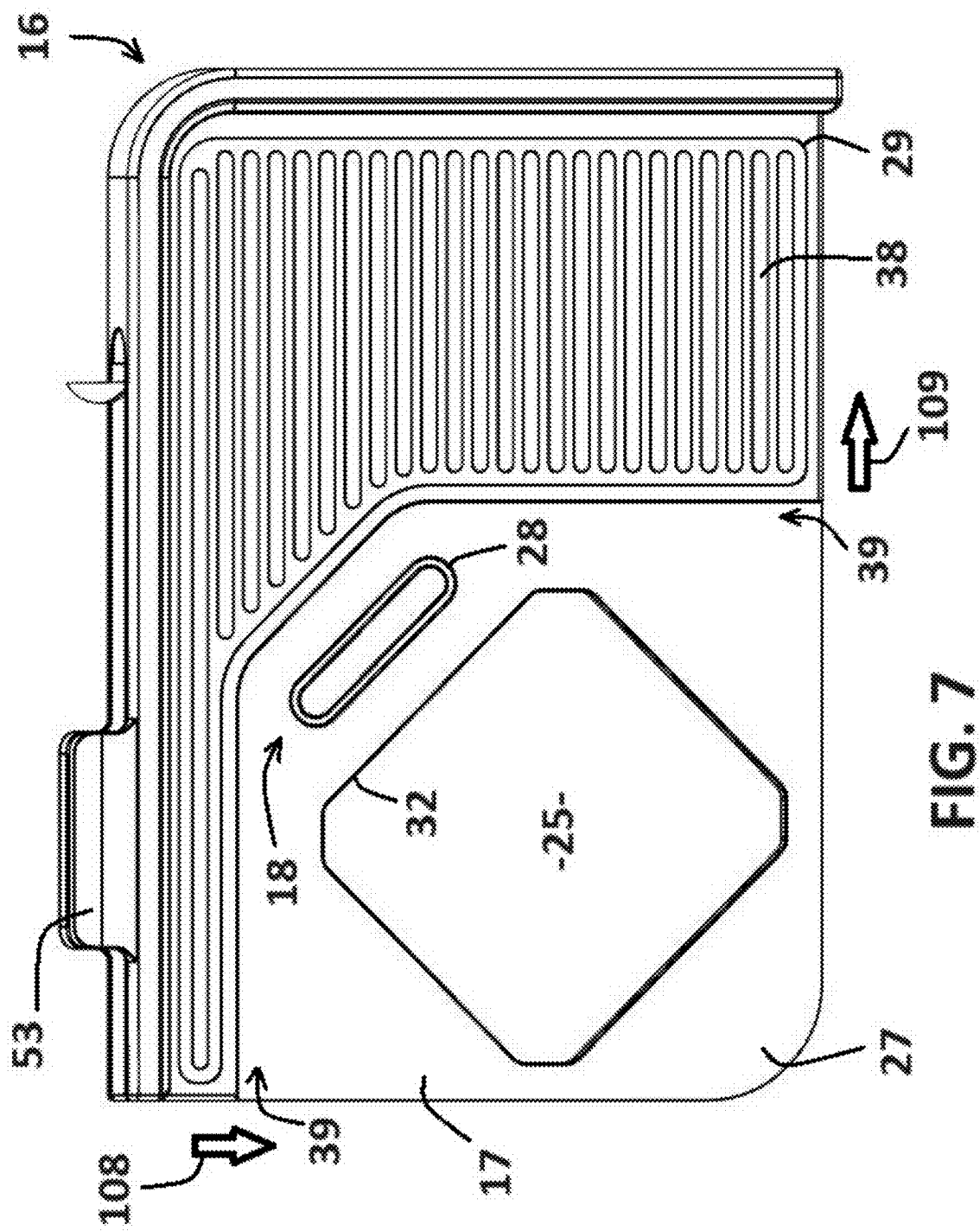
FIG. 7 is an enlarged anterior plan view of an exemplary device-holding cradle segment according to the presently disclosed subject matter, enlarged to show in greater detail anterior features of the exemplary device-holding cradle segment.
Figure 8:
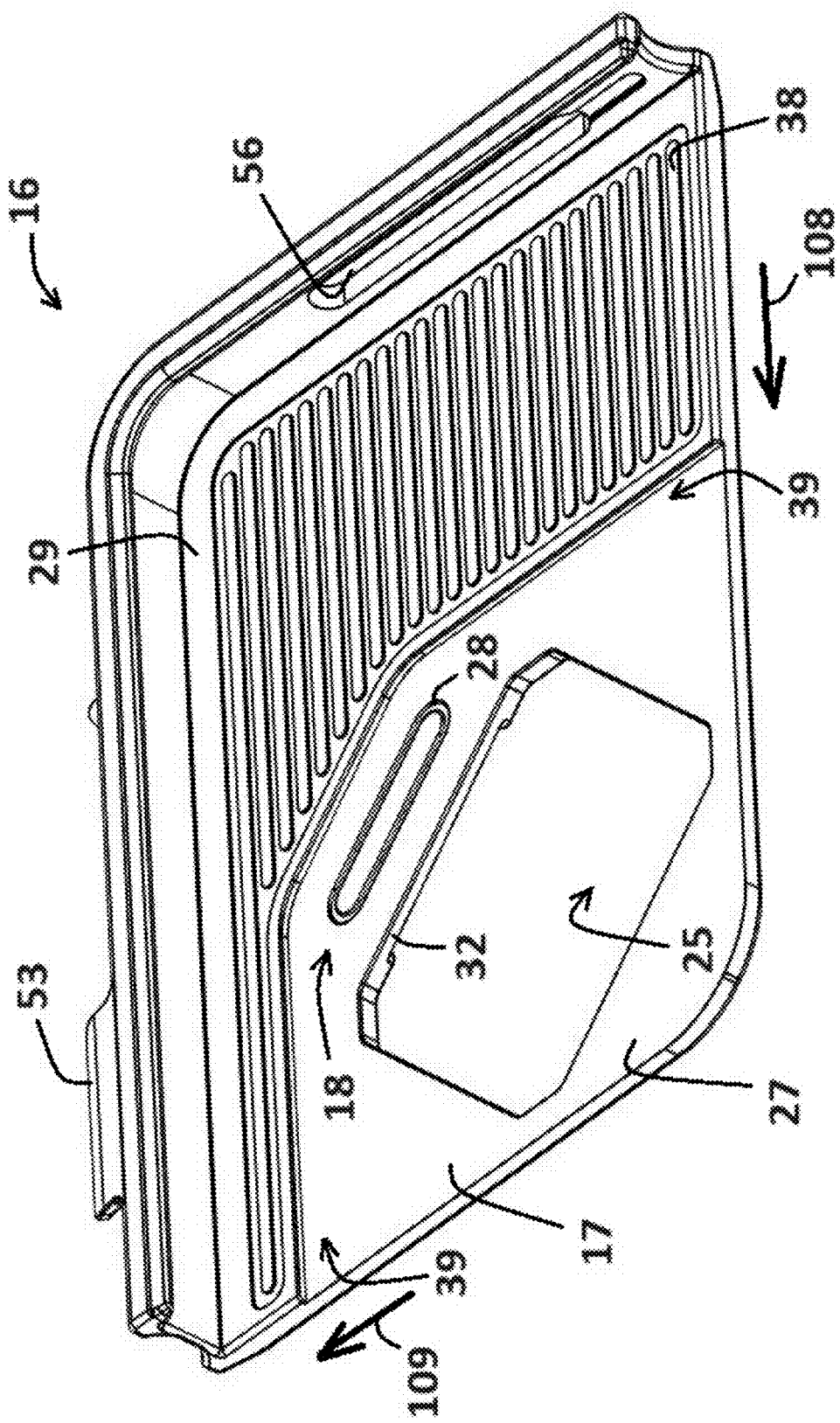
FIG. 8 is an enlarged anterior perspective view of the exemplary device-holding cradle segment otherwise depicted in FIG. 7, enlarged and depicted isometrically to alternatively show in greater detail anterior features of the exemplary device-holding cradle segment.
Figure 9:
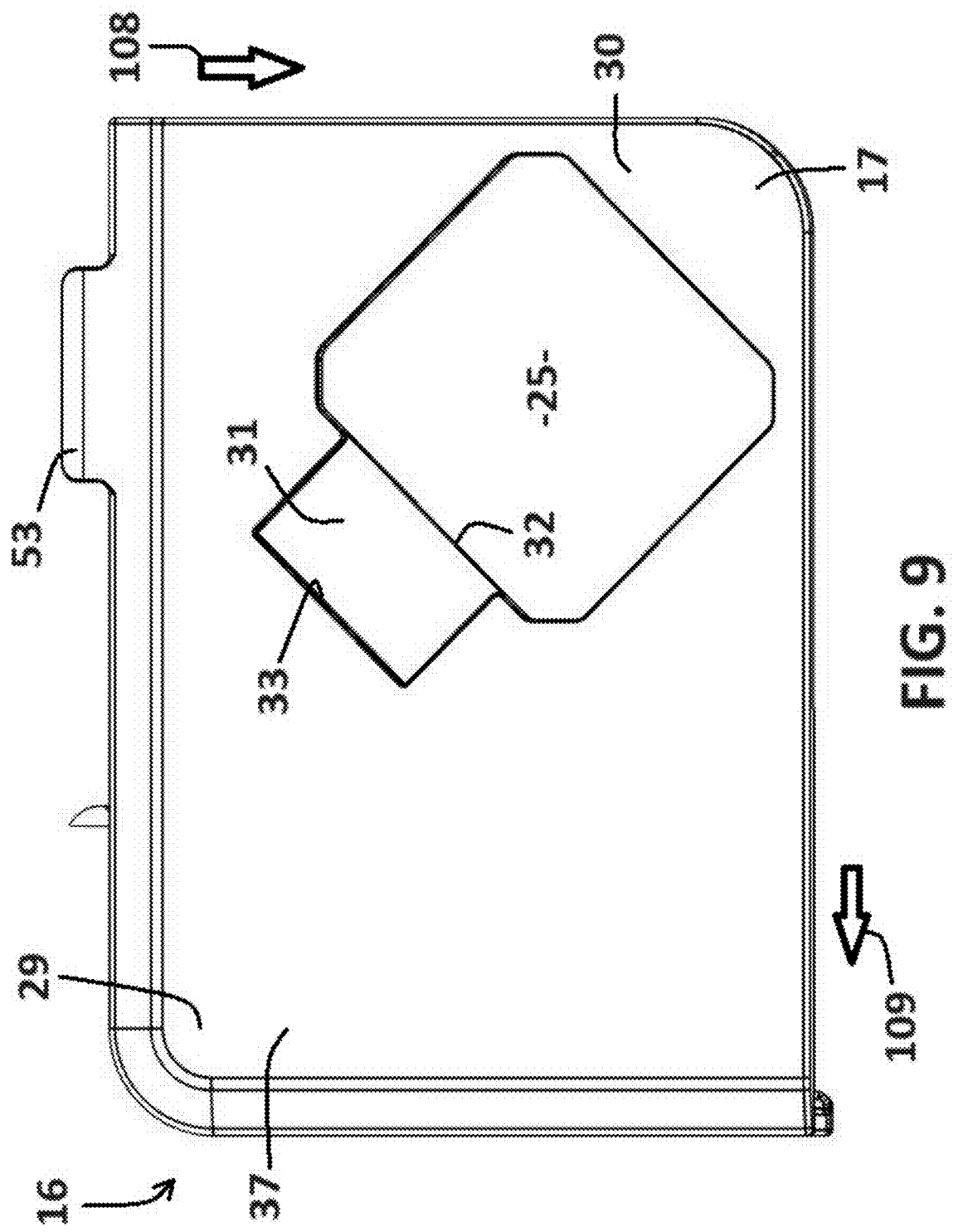
FIG. 9 is an enlarged posterior plan view of an exemplary device-holding cradle segment according to the presently disclosed subject matter, enlarged to show in greater detail posterior features of the exemplary device-holding cradle segment.
Figure 10:
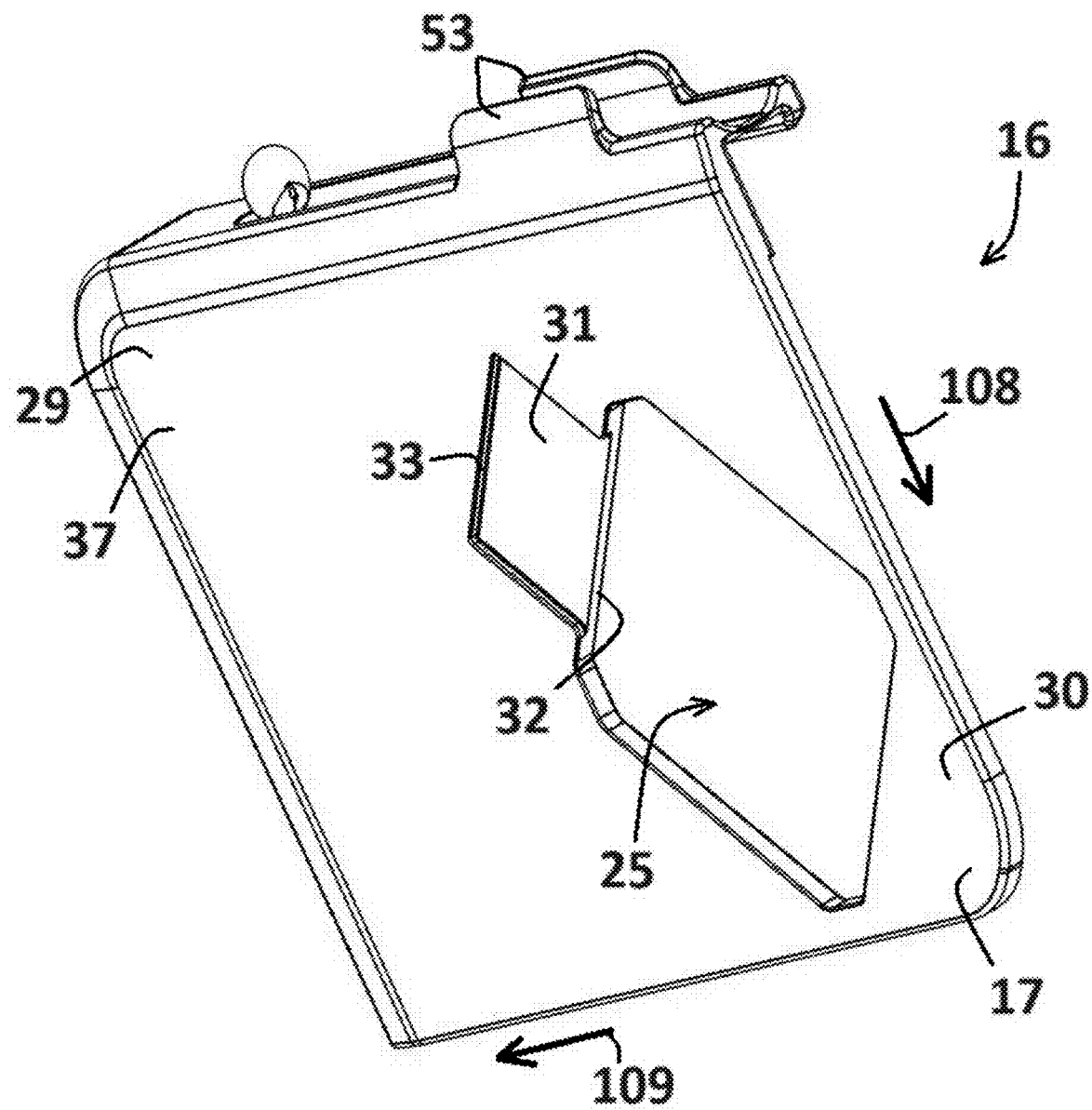
FIG. 10 is an enlarged posterior perspective view of the exemplary device-holding cradle segment otherwise depicted in FIG. 9 enlarged and depicted isometrically to alternatively show in greater detail posterior features of the exemplary device-holding cradle segment.
Figure 11:
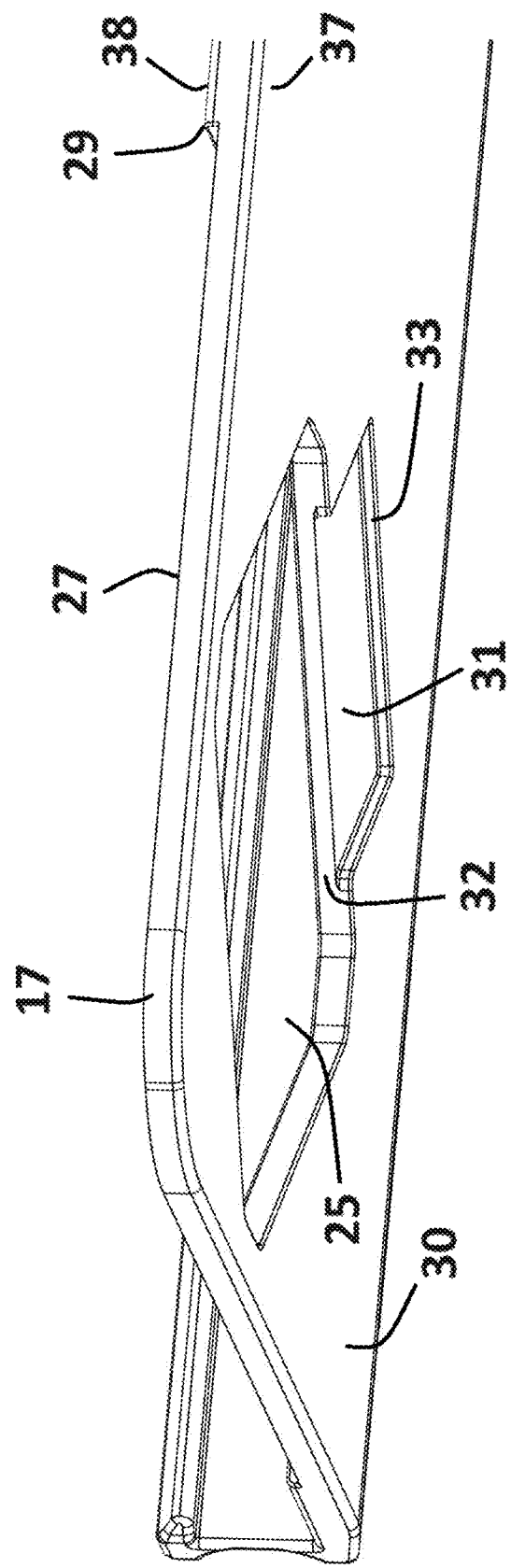
FIG. 11 is an enlarged fragmentary posterior perspective view of the exemplary device-holding cradle segment otherwise depicted in FIG. 10 enlarged and depicted isometrically to alternatively show in greater detail posterior features of the exemplary device-holding cradle segment.

The segmented cradle assembly 12 is further introduced in FIGS. 3 and 4 as separated or removed from an outer folio assembly 13 of the case assembly 10. In some embodiments, the segmented cradle assembly 12 is used in combination with the outer folio assembly 13 and is either enclosed therewithin or supported thereby depending on how the outer folio assembly 13 is configured for use by the user. FIGS. 1 and 2, for example, generally depict the outer folio assembly 13 comprising a number or pivotally interconnected panel sections or portions as at 46, 49, and 24 for supporting the segmented cradle assembly 12 in a generally oblique orientation relative to the support panel section or portion referenced at 24. The interconnected panel sections or portions 46, 49, and 24 are reconfigurable to also encase the segmented cradle assembly 12 although not specifically so illustrated.

The presently disclosed subject matter generally concerns a case assembly 10 with a segmented cradle assembly 12 in most contemplated applications. The overall case assembly 10 and the segmented cradle assembly 12 serve to receive a mobile communications device 11. Once the mobile communication device 11 is received by the segmented cradle assembly 12, it becomes cradled thereby. The outer folio assembly 13 may be variously configured for either supporting the segmented cradle assembly 12 and cradled mobile communications device 11 in a number of display configurations or for encasing the cradled mobile communications device 11 (not specifically illustrated) for protecting the mobile communications device as for example, during transport thereof.

To encase the cradled mobile communications device 11, the panel portion or section 46 is pivoted from the support panel section or portion 24 and becomes planar with the panel section 46 for encasing posterior portions of the segmented cradle assembly 12. The support panel section 24 may then be pivoted to cover the otherwise exposed anterior surfaces of the segmented cradle assembly 12 and cradled mobile communications device 11. In some embodiments, a tab element 54 may be affixed to the panel section 46 for tab-fastening the panel section 46 to the support panel section 24 thereby enclosing or encasing both the anterior and posterior portions of the segmented cradle assembly 12 and cradled mobile communications device 11. In some embodiments, the tab element 54 and the panel section 46 may comprise magnetic means for fastening the opposed structures to one another.

The segmented cradle assembly 12 according to the presently disclosed subject matter as shown in FIGS. 3 and 4 has been separated from the outer folio portion 13 of the case assembly 10 as otherwise depicted in FIGS. 1 and 2 for ease of comparison and understanding. The reader will see from a further consideration of FIG. 1, however, that a generic mobile communications device 11 is there illustrated as received and cradled by the segmented cradle assembly 12 as attached to the outer folio assembly 13. The generic mobile communications device 11 is further depicted and referenced in FIGS. 5 and 6 in isolation from the segmented cradle assembly 12 and outer folio assembly 13 of the case assembly 10 for comparison purposes.

The case assembly 10 according to the presently disclosed subject matter may be referred to as a universal type case assembly. Universal case assemblies of this general type are known in the art and basically function to enable device cradling and/or device encasement for variously sized or dimensioned mobile communications devices 11, which are typically of a rectangular configuration having a device length as at 116 and a device width 117 with a certain overall device depth or thickness 107 as comparatively depicted and referenced in FIGS. 5 and 6. In other words, a singular universal case assembly may be used to encase two or more differently sized mobile communications devices 11. A universal case assembly case assembly may be referred to as a one-size-fits-all type of case assembly.

In this regard, some feature or features of a generic universal case assembly typically involve(s) size-adjustable parts or portions configured so that the user may outfit variously sized mobile communications devices with a single case assembly without the need to purchase another case assembly each time a currently used mobile communications device of a differing size or configuration is replaced or switched out. Users of mobile communications devices may also have multiple devices of differing dimensions or configurations in hand at the same time, and it is often helpful to the user to have a single, universal type case assembly for cradling and/or encasing these variously sized or dimensioned or configured mobile communications devices.

The segmented cradle assembly 12 according to the presently disclosed subject matter is configured to adjustably cradle variously sized mobile communications devices as generically depicted and referenced at 11. In some embodiments, the segmented cradle assembly 12 is attached to the outer folio assembly 13 to provide the case assembly 10 or ensemble combination. In some embodiments, the segmented cradle assembly 12 comprises a centralized segment-anchoring arrangement and an array or plurality of device-holding cradle segments 16 displaceably anchored thereto. In some embodiments, the segment-anchoring arrangement may be characterized by a centralized panel arrangement including an anterior panel 14 as generally depicted and referenced in FIG. 3; a posterior panel 15 as generally depicted and referenced in FIG. 4, and at least two device-holding cradle segments 16. In some embodiments, the segmented cradle assembly 12 comprises an array of four device-holding cradle segments 16, each of which are configured to respectively receive and cradle a device corner or corner portion 19 of a mobile communications device 11.

An exemplary corner type device-holding cradle segment 16 according to the presently disclosed subject matter is generally depicted and referenced in FIGS. 7 through 11. In some embodiments, each device-holding cradle segment 16 comprises two primary sections or portions, including a(n inner) arrangement-opposing portion or panel-opposing portion 17 and a(n outer) device-cradling portion 29. The arrangement-opposing or panel-opposing portion 17 is positioned centrally or inwardly as at arrow 108 and the device-cradling portion 29 is positioned outwardly as at arrow 109 relative to the unit. When the array of device-holding cradle segments 16 are assembled to form the segmented cradle assembly 12, the panel-opposing portions 17 together define a centralized panel-receiving or panel-accommodating cavity 26 and the device-cradling portions 29 are positioned to secure the corner portions or device corners 19 of the mobile communications device 11.

In some embodiments, the panel-opposing portion 17 comprises a tether-anchoring portion 18 and a tether-letting window 25. In some embodiments, the tether-anchoring portion 18 is positioned outwardly relative to the inwardly positioned tether-letting window 25. In some embodiments, the tether-anchoring portion 18 is positioned intermediate the tether-letting window 25 and the device-cradling portion 29. The tether-anchoring portion 18 at an anterior surface 27 of the panel-opposing portion 17 may, in some embodiments, comprise a stitch-receiving groove 28 outwardly adjacent an outer edge 32 of the tether-letting window 25. The tether-anchoring portion 18 at a posterior surface 30 of the panel-opposing portion 17 may, in some embodiments, comprise a tether-receiving cavity 31 extending outwardly from the outer edge 32 of the tether-letting window 25. An outer edge 33 of the tether-receiving cavity 31 is positioned posteriorly relative to the stitch-receiving groove 28 in some embodiments.

In some embodiments, elastic tether elements 20 essentially provide or support the adjustability of the device-holding cradle segments 16. The elastic tether members 20 may be elastically actuated for increasing distances intermediate device-holding cradle segments 16 and elastically returned for decreasing distances intermediate device-holding cradle segments 16. The tether-receiving cavity 31 is configured receive and position a first tether end 34 of the elastic tether member 20 in some embodiments. The tether-receiving cavity 31 has a depth for receiving a tether thickness of the elastic tether member 20 so that posterior surface of the elastic tether member 20 and the posterior surface 30 of the panel-opposing portion 17 are flush when the first tether end 34 is received in the tether-receiving cavity 31. The first tether end 34 is attached to the tether-anchoring portion 18 of the panel-opposing portion 17.

In some embodiments, the first tether end 34 may be stitched to the tether-anchoring portion 18 so as to anchor the same to the panel-opposing portion 17. In this regard, stitching may be applied to the first tether end 34 by way of the stitch-receiving groove 28. In some embodiments, the stitch-receiving groove 28 may be in the form of an oval, racetrack or similar other two-dimensional geometric configuration to both enhance secure anchored attachment of the first tether end 34 to the tether-anchoring portion 18 and provide for a more appealing visual appearance of the anchor site anteriorly as, for example, when a mobile communications device 11 is removed from the segmented cradle assembly 12 thereby revealing anterior portions of the segmented cradle assembly 12.

Figure 12:
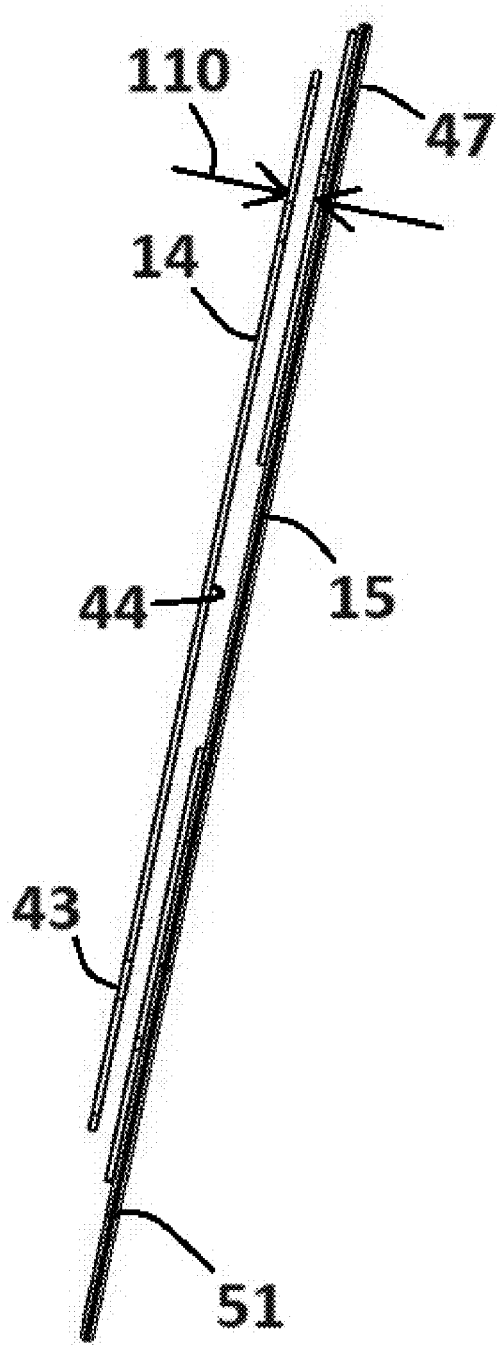
FIG. 12 is a lateral edge view of a centralized panel arrangement of the segmented cradle assembly according to the presently disclosed subject matter with device-holding cradle segments removed to show a spacing intermediate an anterior panel and a posterior panel of the centralized panel arrangement.
Figure 13:
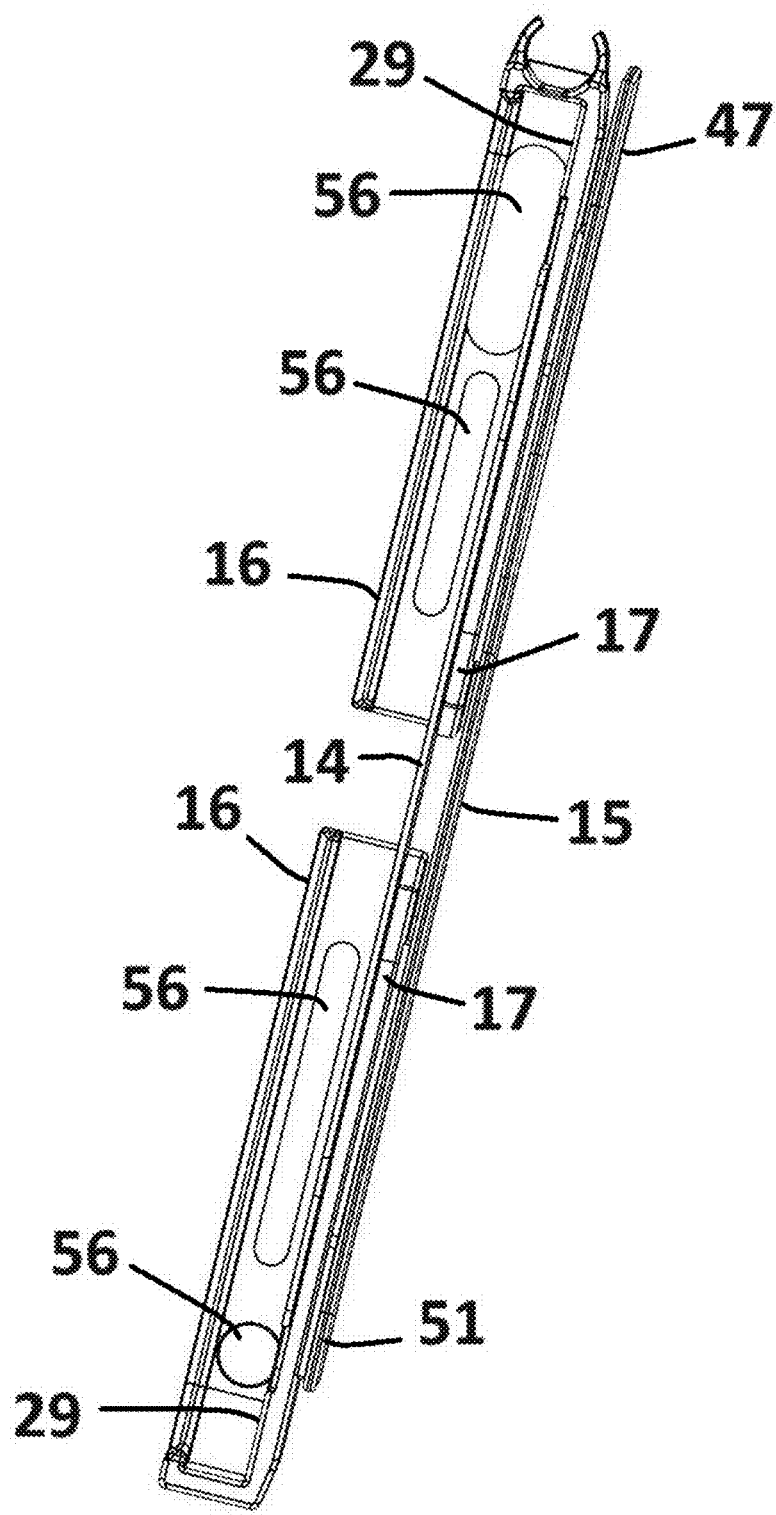
FIG. 13 is an enlarged lateral edge view of a partial segmented cradle assembly according to the presently disclosed subject matter with certain device-holding cradle segments removed to show the structural relationship of the remaining device-holding cradle segments relative to an anterior panel and a posterior panel of a centralized panel arrangement.

The elastic tether member 20 is extended through the tether-letting window 25 inwardly relative to the device-cradling portion 29 of the device-holding cradle segment 16 and a second tether end 35 opposite the first tether end 34 is anchored to the anterior panel 14 and the posterior panel 15 in some embodiments. In some embodiments, the second tether end 35 is stitched to the anterior panel 14 and the posterior panel 15. The anterior panel 14 of the centralized panel arrangement is spaced as at spacing 110 from the posterior panel 15 such that the panel-opposing portions 17 of the device-holding cradle segments 16 may be loosely or displaceably sandwiched intermediate the anterior panel 14 and the posterior panel 15 of the centralized panel arrangement. This spaced arrangement of the anterior panel 14 and the posterior panel 15 is generally depicted in FIGS. 12 and 13.

Figure 20:
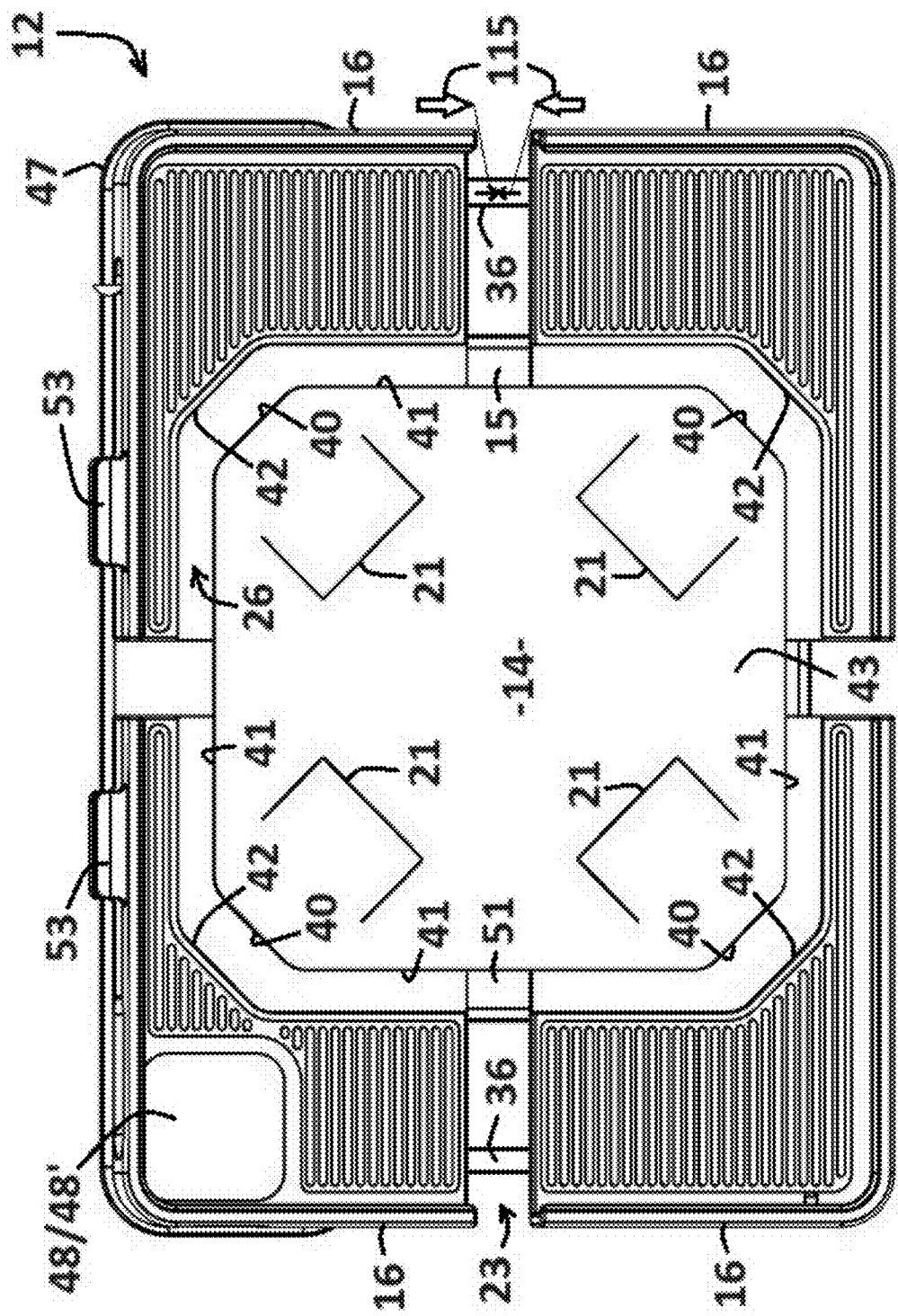
FIG. 20 is an enlarged anterior plan view of the segmented cradle assembly according to the presently disclosed subject matter shown with the array of device-holding cradle segments in an actuated configuration to provide gaps therebetween.
Figure 21:
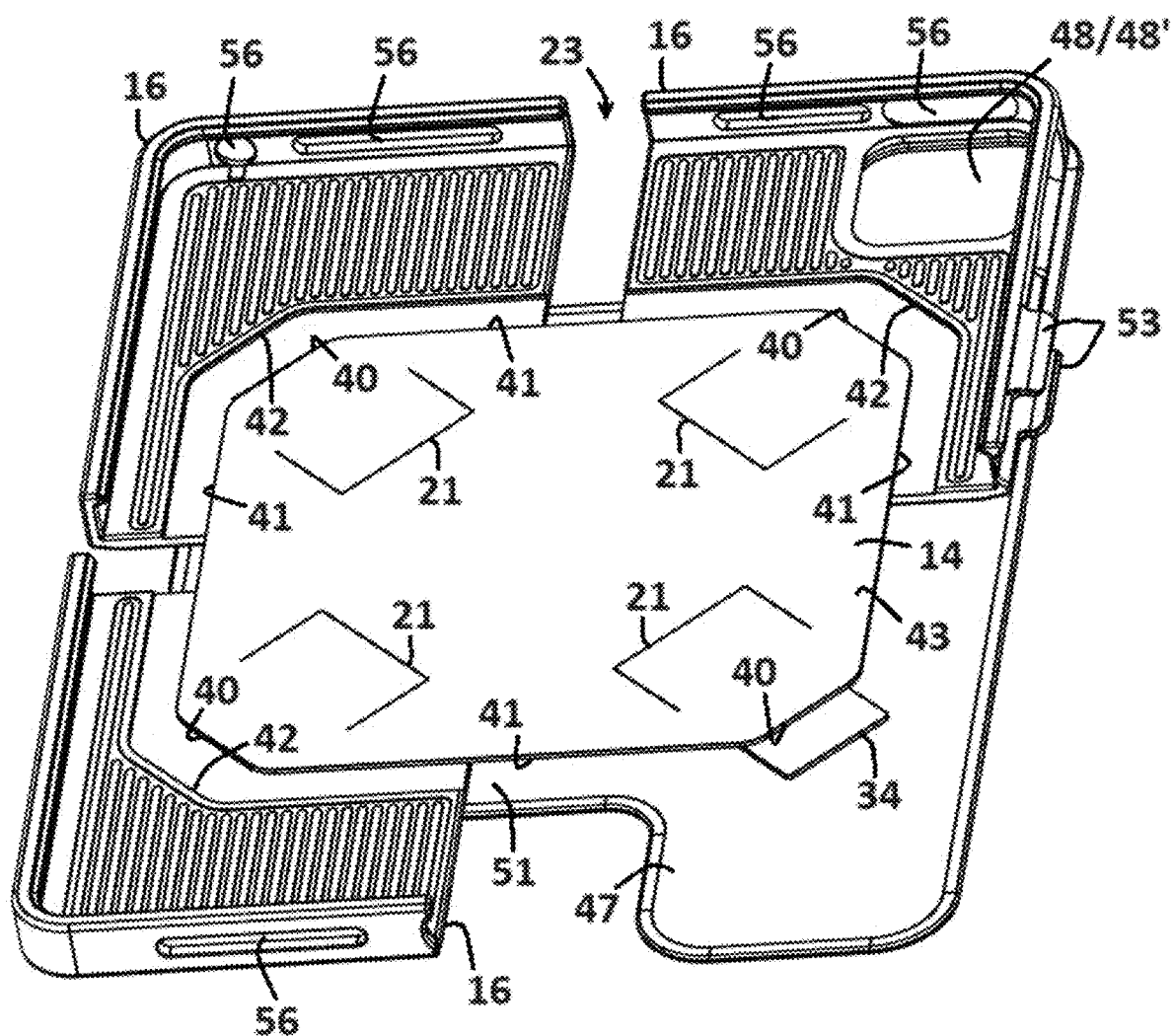
FIG. 21 is an enlarged anterior perspective view of a partial segmented cradle assembly according to the presently disclosed subject matter shown with a select device-holding cradle segment removed to show positioned placement of an elastic tether member at the site where the select device-holding cradle segment removed.
Figure 22:
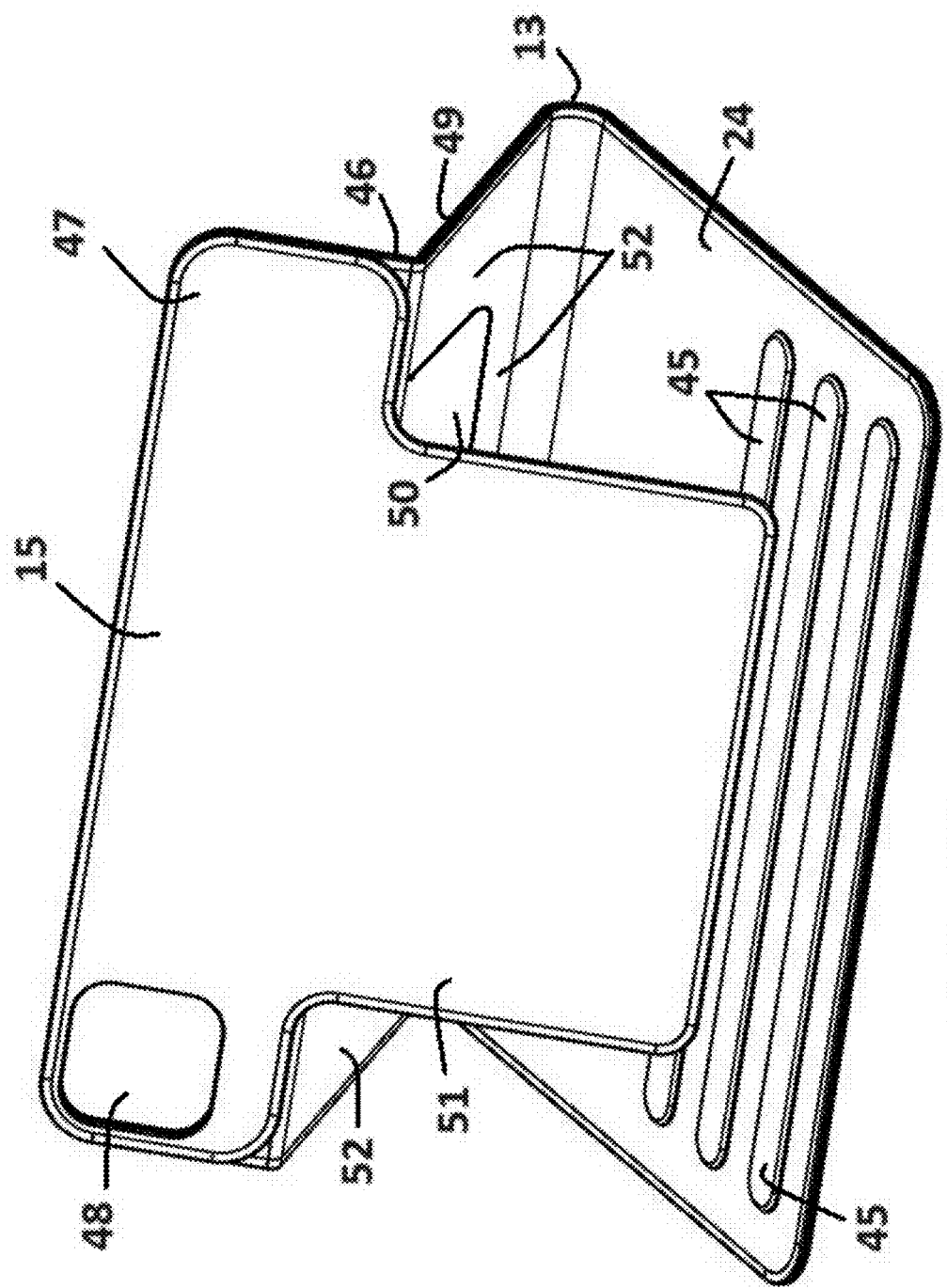
FIG. 22 is an anterior top perspective view of a partial case assembly according to the presently disclosed subject matter shown with the posterior panel of the segmented cradle assembly shown attached to an outer folio assembly of the case assembly.
Figure 23:
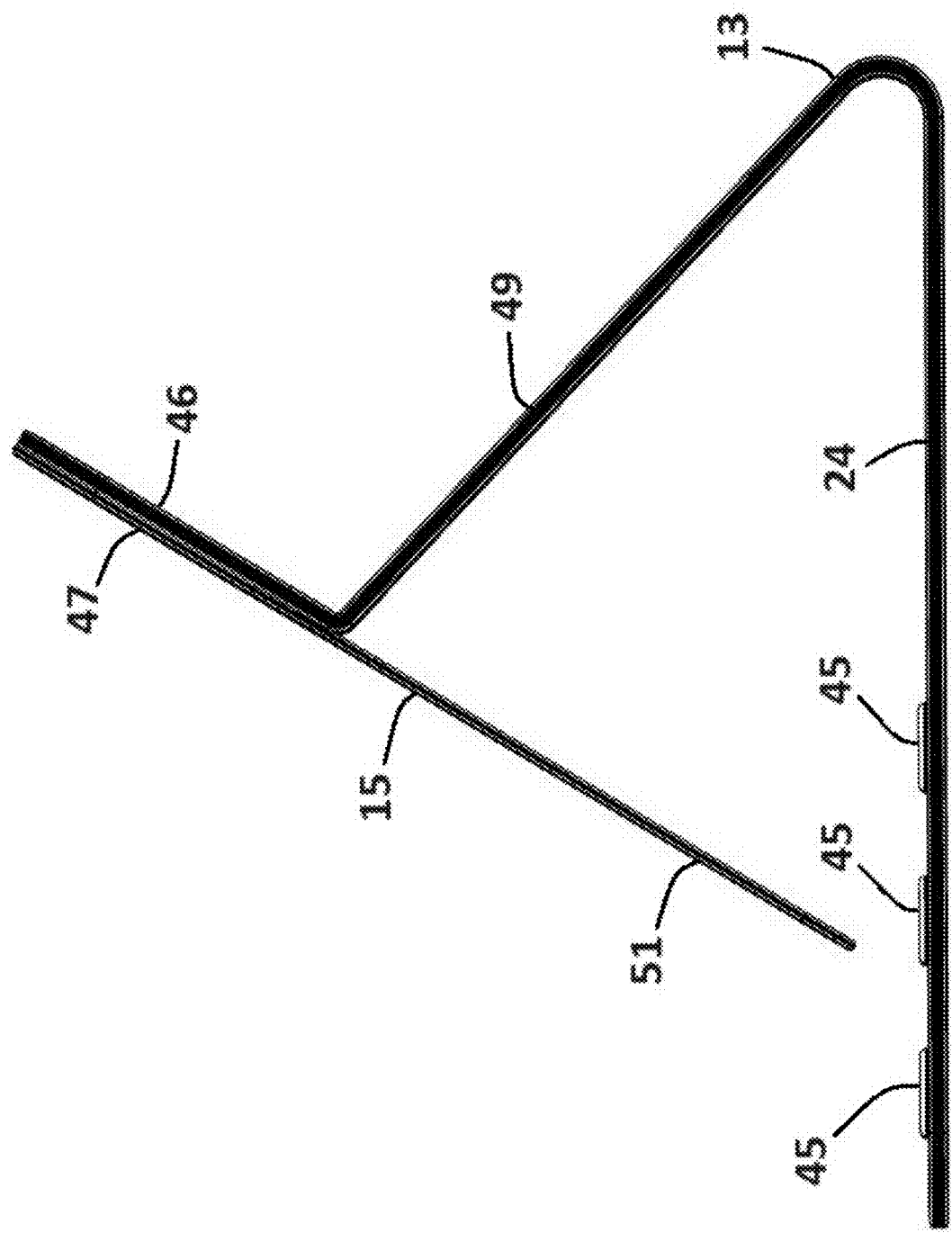
FIG. 23 is an enlarged elevational lateral edge view of the posterior panel of the segmented cradle assembly shown attached to the outer folio assembly of the case assembly as otherwise depicted in FIG. 22.
Figure 24:
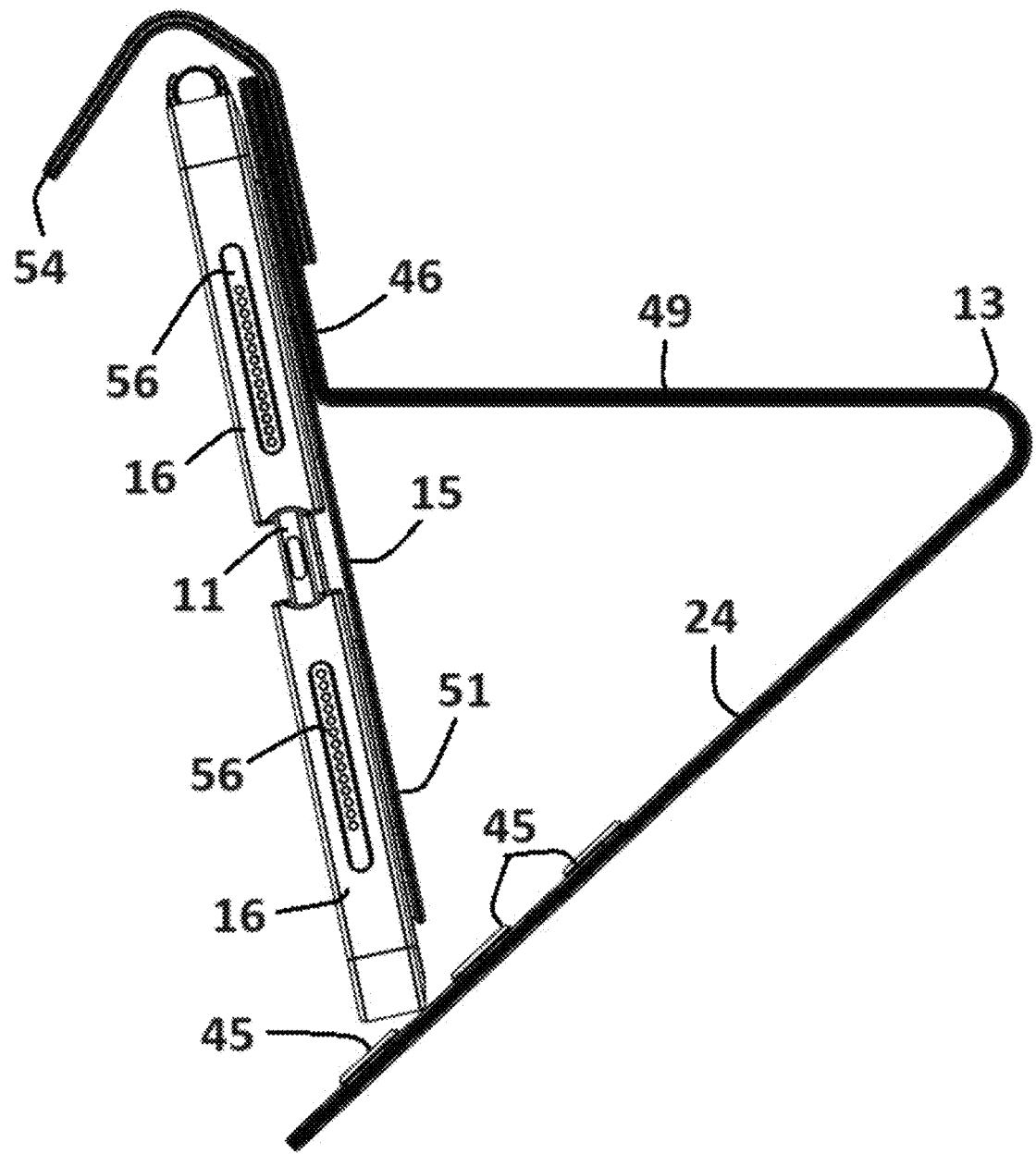
FIG. 24 is an enlarged elevational first lateral edge view of the case assembly according to the presently disclosed subject matter shown in a cradle support configuration.
Figure 25:
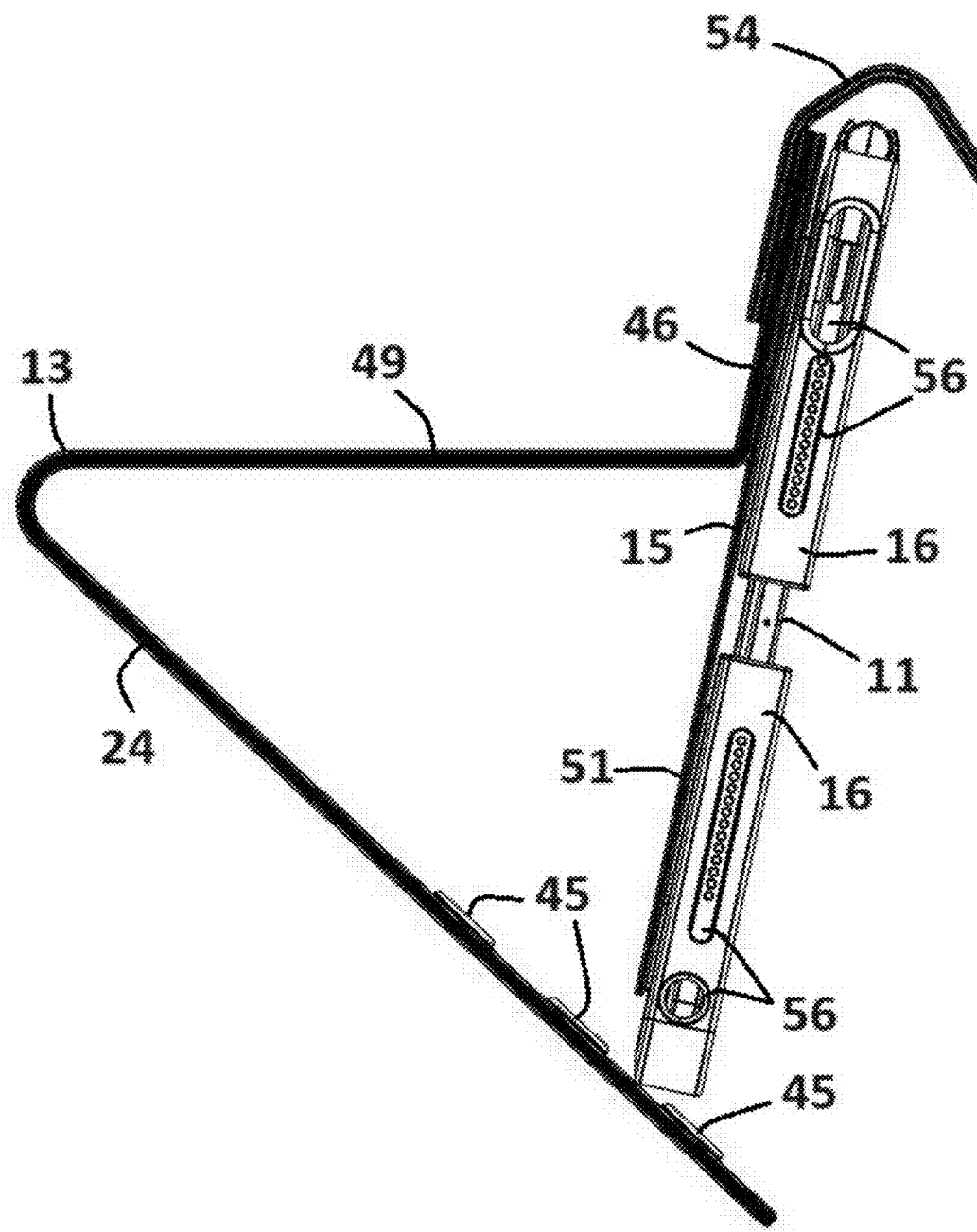
FIG. 25 is an enlarged elevational second lateral edge view of the case assembly according to the presently disclosed subject matter shown in a cradle support configuration.
Figure 26:
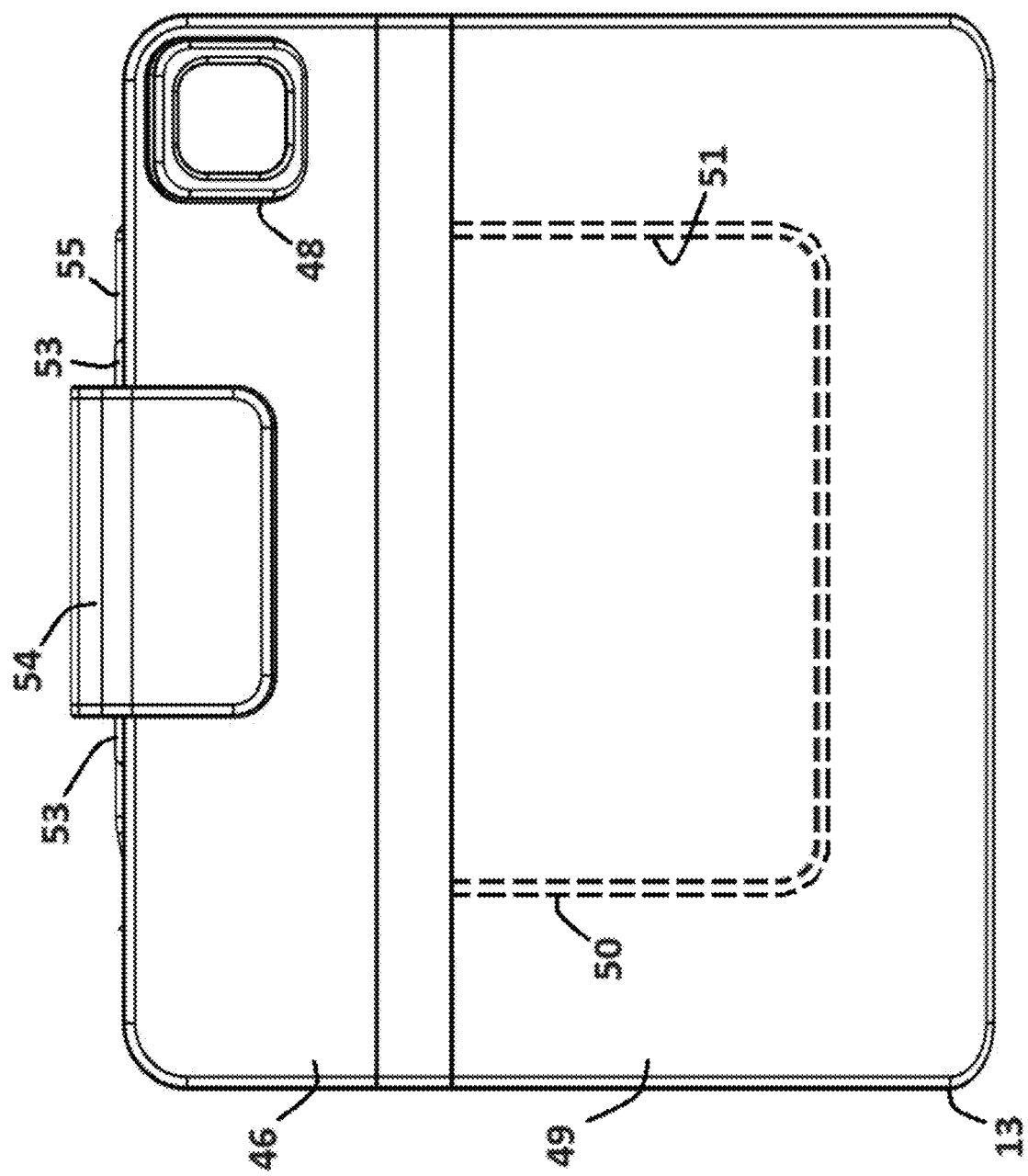
FIG. 26 is an enlarged posterior view of the case assembly according to the presently disclosed subject matter depicting the structural relationship of a panel-receiving cavity and an anchor portion of the posterior panel received in the panel-receiving cavity.
Figure 27:
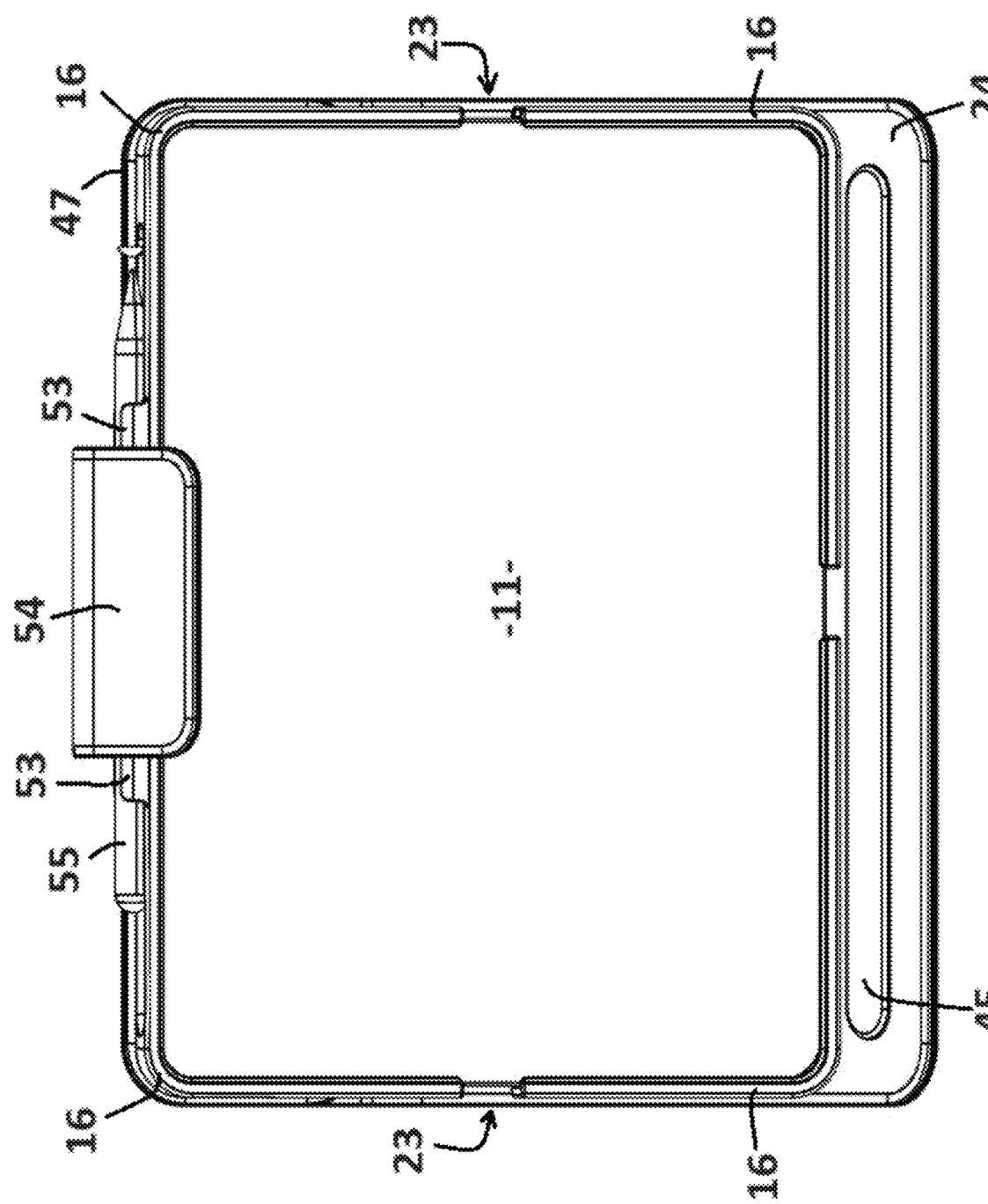
FIG. 27 is an enlarged anterior view of the case assembly according to the presently disclosed subject matter shown in a cradle support configuration with the segmented cradle assembly cradling a generic mobile communications device.

Accordingly, it will be understood the tether-anchoring portions 18 of the device-holding cradle segments 16 are thereby attached to the anterior panel 14 and the posterior panel 15 by way of an array of elastic tether members 20 in some embodiments. The tether thickness of the elastic tether members 20 is lesser than the spacing 110 between the anterior panel 14 and the posterior panel 15 so as to enable free resilient actuation as at arrow 114 and resilient return as at arrow 115 of the elastic tether members 20 as depicted and referenced in FIG. 20. Further, the panel thickness 111 of the panel-opposing portions 17 of the device-holding cradle segments 16 is lesser than the spacing 110 so as to enable linear displacements of each device-holding cradle segment 16 relative to the anterior panel 14 and the posterior panel 15 for enabling the user to displace the device-holding cradle segments 16 relative to the central panel arrangement and to one another for adjustably cradling variously sized mobile communications devices as generally referenced at 11.

Figure 16:
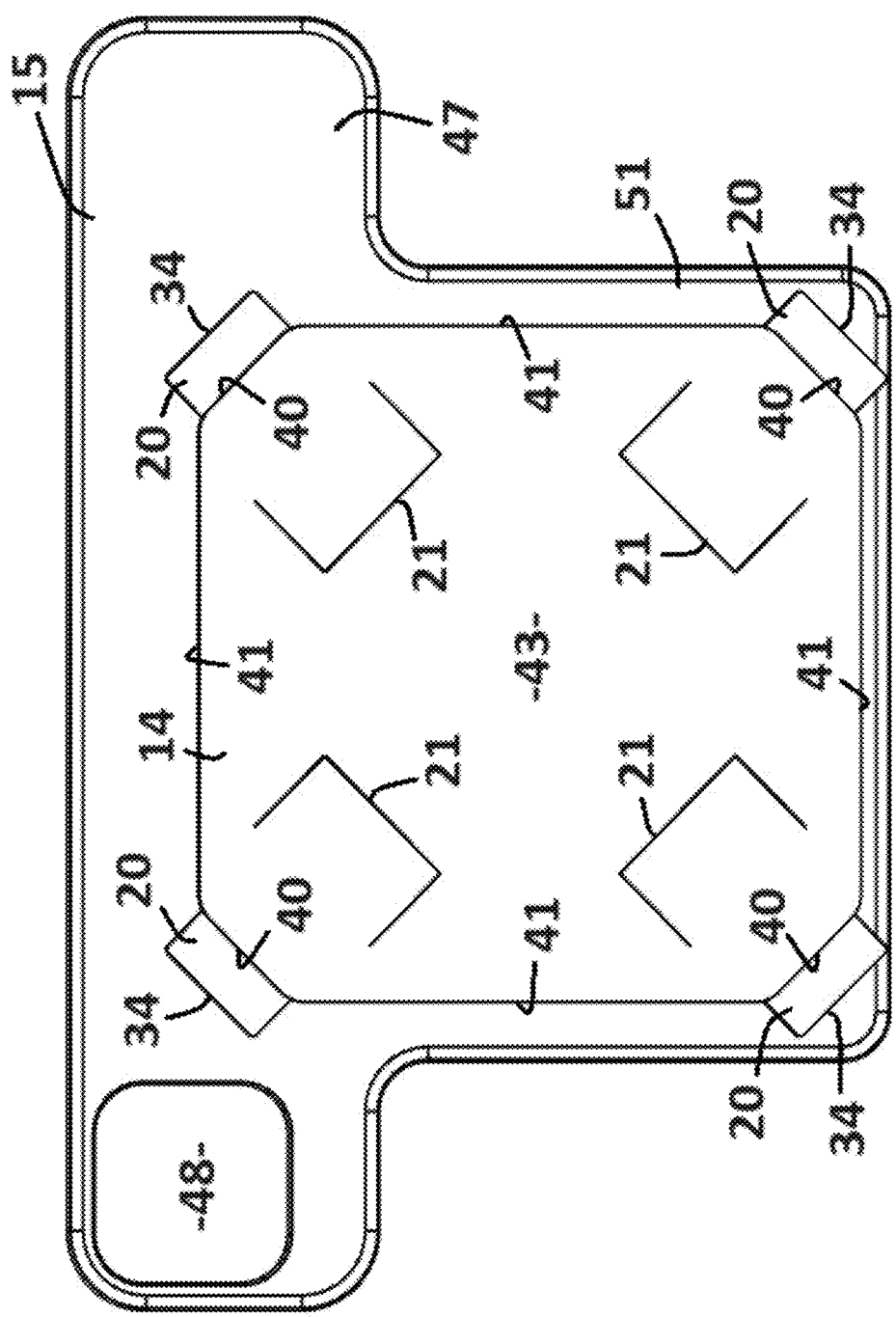
FIG. 16 is an anterior plan view of a partial segmented cradle assembly according to the presently disclosed subject matter shown with all device-holding cradle segments removed to show the relationship of the anterior panel relative to the posterior panel and positioned placement of an array of elastic tether elements stitched to the anterior panel by way of an array of stitch lines upon the anterior panel.
Figure 17:
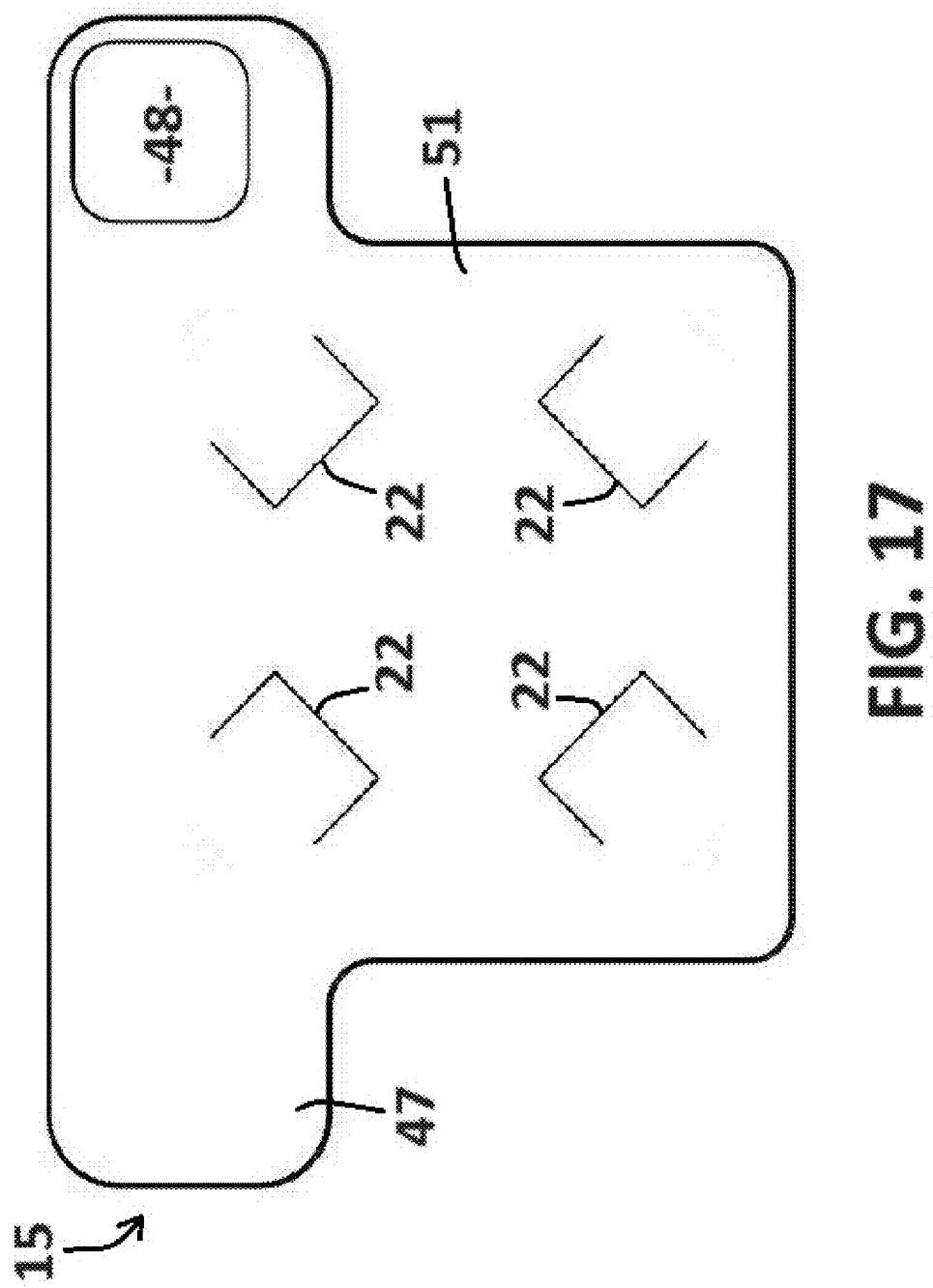
FIG. 17 is a posterior plan view of the posterior panel showing an array of stitch lines upon the posterior panel.

In some embodiments, the elastic tether members 20 are anchored (e.g., stitched) to both the anterior panel 14 and the posterior panel 15 at the second tether ends 35 and anchored (e.g., stitched) at the tether-anchoring portions 18 of the device-holding cradle segments 16 at the first tether ends 34. The lengths of the elastic tether members 20 extend through the tether-letting windows 25 formed in the panel-opposing portions 17. Stitch lines where the elastic tether members 20 are anchored to the anterior panel 14 and the posterior panel 15 are depicted and referenced at 21 and 22, respectively in FIGS. 16 and 17. While stitch lines 21 and 22 have been illustrated and referenced in the drawings submitted in support of these specifications, this type of attachment of the elastic tether members 20 to the anterior panel 14 and the posterior panel 15 and to the tether-anchoring portions 18 should not be construed as limiting, but exemplary. Other types of attachment means are contemplated including, but not limited to mechanical fasteners or adhesive means for attachment.

The panel-opposing portions 17 and device-holding cradle segments 16 are resiliently displaceable relative to the anterior panel 14 and the posterior panel 15 of the central panel arrangement and to one another via the elastic tether members 20 for selectively adjusting distances 112 between adjacent device-holding cradle segments 16 to form gaps 23 for adjustably receiving and together cradling variously sized mobile communications devices 11. In some embodiments, it is contemplated at least two device-holding cradle segments are displaceable relative to one another for adjusting at least one of a cradle length as at 100 and a cradle width as at 101 of the segmented cradle assembly 12. In other words, either the cradle length 100 may be adjusted via the resilient displacement of two widthwise extending device-holding cradle segments (not specifically illustrated) or the cradle width 101 may be adjusted via the resilient displacement of two lengthwise extending device-holding cradle segments (not specifically illustrated) depending on the dimensions of the mobile communications device 11 to be cradled.

In this regard, the present specifications contemplate a segmented cradle assembly whereby two opposed device-holding cradle segments that extend lengthwise may be displaced widthwise relative the central panel arrangement so as to enable the user to adjust the effective cradle width of the segmented cradle assembly. Further, the present specifications contemplate a segmented cradle assembly whereby two opposed device-holding cradle segments that extend widthwise may be displaced lengthwise relative to the central panel arrangement so as to enable the user to adjust the effective cradle length of the segmented cradle assembly.

In a preferred application, however, the segmented cradle assembly 12 comprises an array of four device-holding cradle segments 16 for receiving and cradling device corners 19 of a mobile communications device 11. The device-holding cradle segments 16 may be resiliently displaced by way of the elastic tether members 20 or elastic tether elements both lengthwise and widthwise so as to enable the user to adjust both the effective cradle length 100 and the effective cradle width 101 of the segmented cradle assembly 12. Once a mobile communications device 11 is centered relative to the resiliently actuated elastic tether members 20, the device-holding cradle segments 16 may be returned via the elastic tether members 20 to securely cradle the device corners 19 of a mobile communications device 11.

Figure 19:
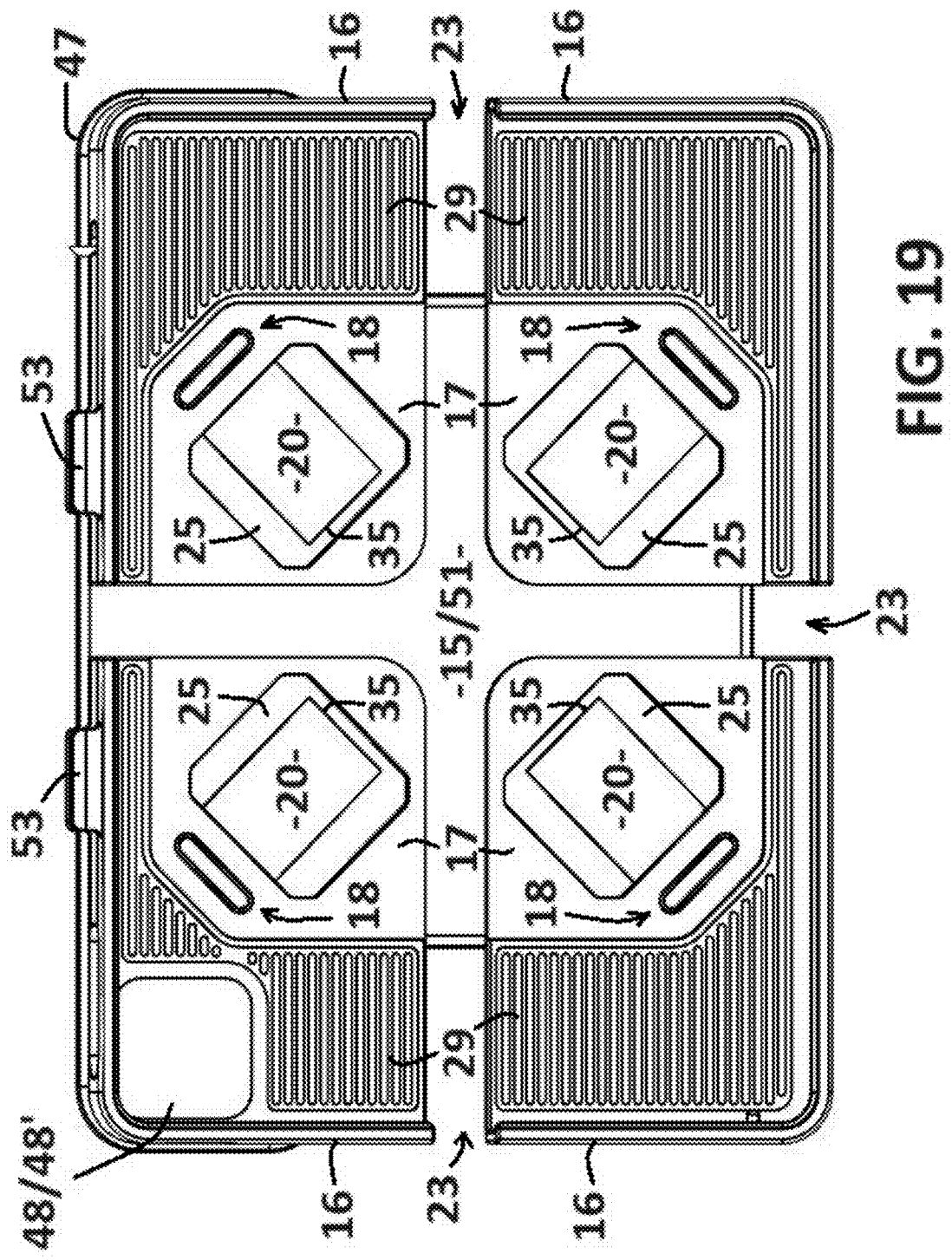
FIG. 19 is an enlarged anterior plan view of a partial segmented cradle assembly according to the presently disclosed subject matter shown with the anterior panel removed to show positioned placement of the array of device-holding cradle segments shown in an actuated configuration to provide gaps therebetween.

A mobile communications device 11 typically comprises a medial device axis 102 that extends lengthwise through the center of the mobile communications device 11 and a transverse device axis 103 that extends widthwise through the center of the mobile communications device 11 as generally depicted and referenced in FIG. 5. In some embodiments, the device-holding cradle segments 16 are adjustable relative to one another and to the central panel arrangement along a medial cradle axis 104 that extends lengthwise through the center of a cradle segment arrangement and along a transverse cradle axis 105 that extends widthwise through the center of the cradle segment arrangement as generally depicted and referenced in FIG. 19. In some embodiments, the medial cradle axis 104 generally corresponds or is in alignment with the medial device axis 102 and the transverse cradle axis 105 corresponds or is in alignment with the transverse device axis 103. When the device-holding cradle segments 16 are displaced, gaps 23 therebetween generally extend along the medial and transverse cradle axes 104/105.

Figure 18:
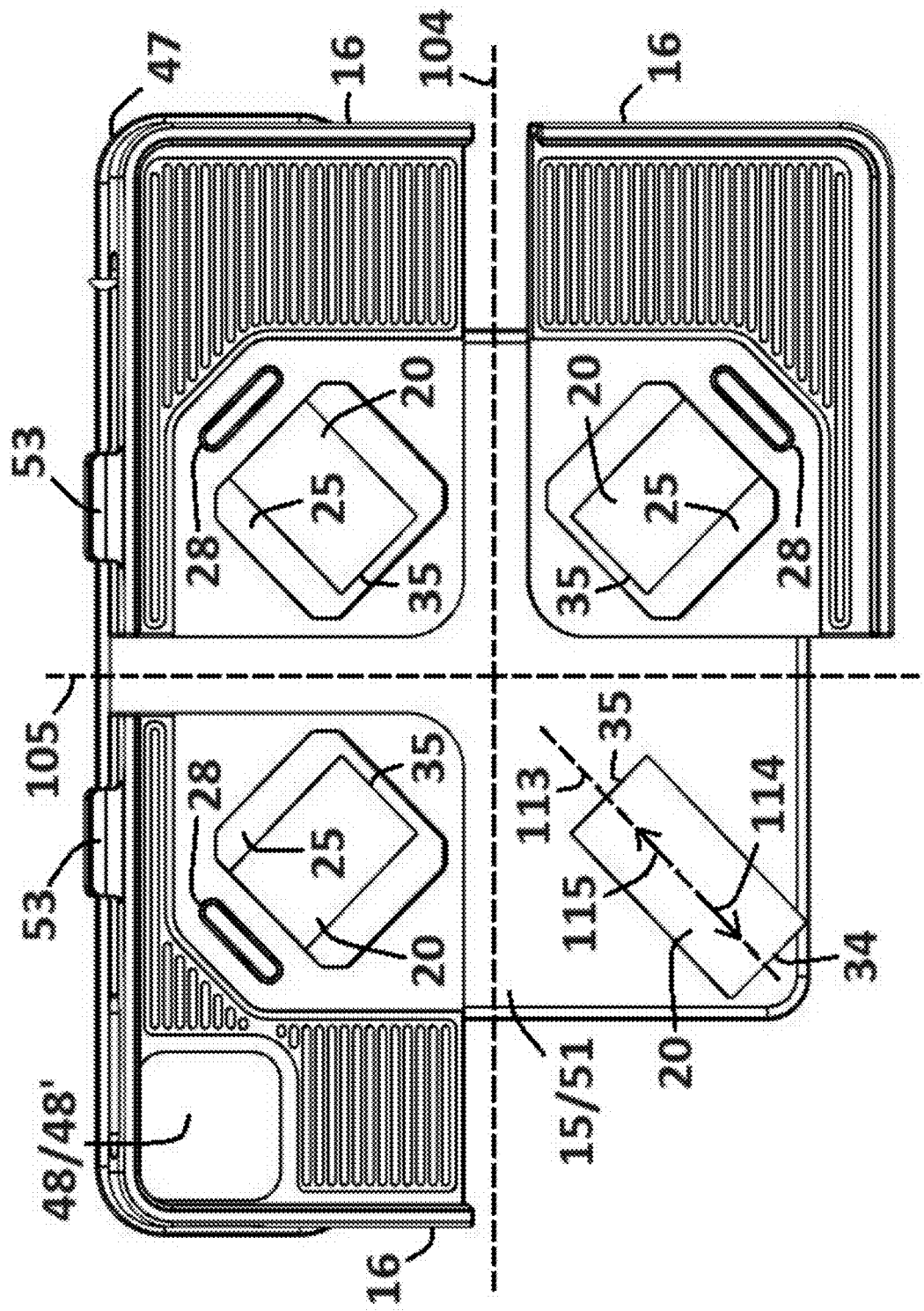
FIG. 18 is an enlarged anterior plan view of a partial segmented cradle assembly according to the presently disclosed subject matter shown with a select device-holding cradle segment and the anterior panel removed to show positioned placement of an elastic tether member relative to the posterior panel.

In some embodiments, the elastic tether members 20 comprise tether axes 113 that extend obliquely relative to the medial cradle axis 104 and the transverse cradle axis 105 as generally depicted and referenced in FIG. 18. In some embodiments, this configuration allows displacement of the device-holding cradle segments 16 along segment displacement axes corresponding to the tether axes 113 that further extend obliquely relative to the cradle length 100 and the cradle width 101. Accordingly, in some embodiments, the device-holding cradle segments 16 may individually be displaced obliquely relative to the cradle length 100 and the cradle width 101 for enabling the user to cradle variously sized mobile communications devices 11. The obliquely angled tether displacement axes extending along tether axes 113 enable simultaneous displacement of the device-holding cradle segment both widthwise and lengthwise.

In some embodiments, at least two adjacent device-holding cradle segments 16 may be elastically tethered to one another via secondary tether elements 36 for enhancing securement of two adjacent device-holding cradle segments 16 to one another and to the mobile communications device 11. Exemplary secondary tether elements 36 are depicted and referenced in FIG. 20. Return action of the secondary tether elements 36 is generally depicted and referenced at arrows 115. In some embodiments, the secondary tether elements 36 are anchored to the posterior surfaces 37 of the device-cradling portions 29 of so anchored device-holding cradle segments 16. In some embodiments, a stitch-receiving groove akin to stitch-receiving groove 28 may be formed at the anterior surface 38 of the device-cradling portion 29 in which groove stitching may be directed for anchoring the secondary tether elements 36 to so anchor the device-holding cradle segments 16 to one another via end portions of the secondary tether element 36.

In some embodiments, the device-holding cradle segments 16 each comprise an outer anterior cradle surface defined by the anterior surface 38 at the device-cradling portion 29 and an inner anterior cradle surface defined by the anterior surface 27 at the panel-opposing portion 17. In some embodiments, the inner anterior cradle surface as so defined is offset from the outer anterior cradle surface as so defined such that corner portions 40 of the anterior panel 14 extend into an offset space 39 defined by each device-holding cradle segment 16. Together the offset spaces 39 combine to form the centralized panel-receiving or panel-accommodating cavity 26 as comparatively depicted in FIGS. 4, 19 and 20. In some embodiments, the corner portions 40 are obliquely angled relative to the side edges 41 of the anterior panel 14. In some embodiments, the offset spaces 39 are defined outwardly toward the device-cradling portions 29 by corresponding obliquely angled offset edges 42.

In some embodiments, the anterior panel 14 comprises a substantially planar anterior panel surface 43. In some embodiments, the anterior panel surface 43 and the outer anterior cradle surfaces of the device-holding cradle segments 16, as defined by the anterior surfaces 38 of the device-cradling portions 29, are coplanar. In this regard, the offset spaces 39 of the panel-opposing portions are configured to comprise a sufficient offset that generally corresponds to thickness of the anterior panel 14 in some embodiments. In some embodiments, the outer anterior cradle surfaces as defined by anterior surface 38 at the device-cradling portion 29 are grooved and the inner anterior cradle surfaces as defined by the anterior surface 27 at the panel-opposing portion 17 are smooth. The grooved outer anterior cradle surfaces provide for enhanced heat dissipation and the smooth inner anterior cradle surfaces provide for enhanced displacements of the panel-opposing portions 17 relative to the posterior surface 44 of the anterior panel 14 by minimizing friction between opposing structures.

As earlier introduced, the segmented case assembly 12 according to the presently disclosed subject matter may be used in combination with an outer folio assembly 13 to provide the case assembly 10 for selectively encasing the segmented cradle assembly 12 or selectively supporting the segmented cradle assembly 12 upon the support panel 24 for purposes of selectively displaying a cradled mobile communications device 11. In some embodiments, the support panel 24 may be outfitted with an array of step formations 45 that operate to prop the segmented cradle assembly 12 in variously obliquely angled configurations relative the support panel 24.

Figure 14:
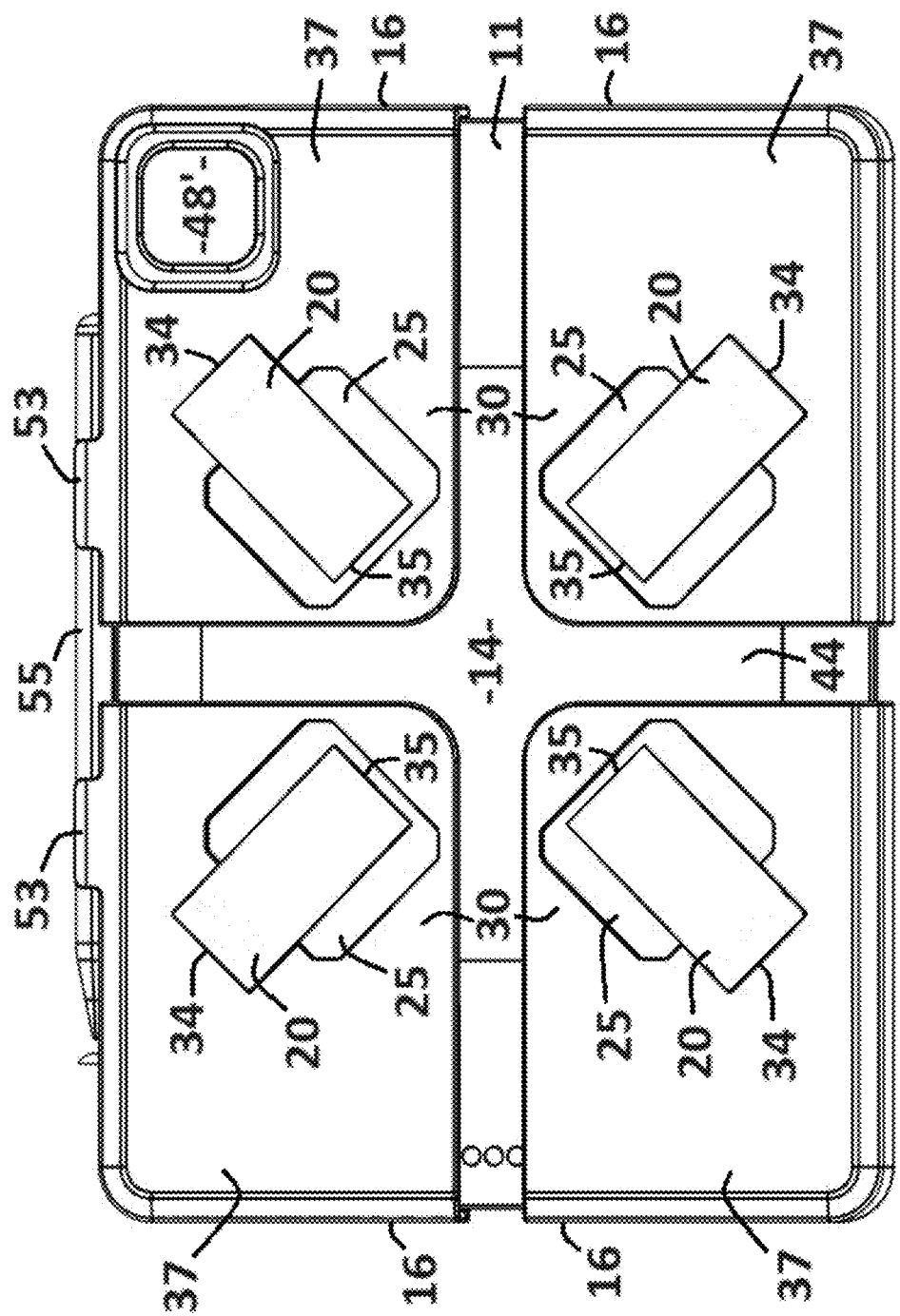
FIG. 14 is a posterior plan view of a partial segmented cradle assembly according to the presently disclosed subject matter with the posterior panel removed to reveal otherwise hidden features and an actuably displaced array of device-holding cradle segments.
Figure 15:
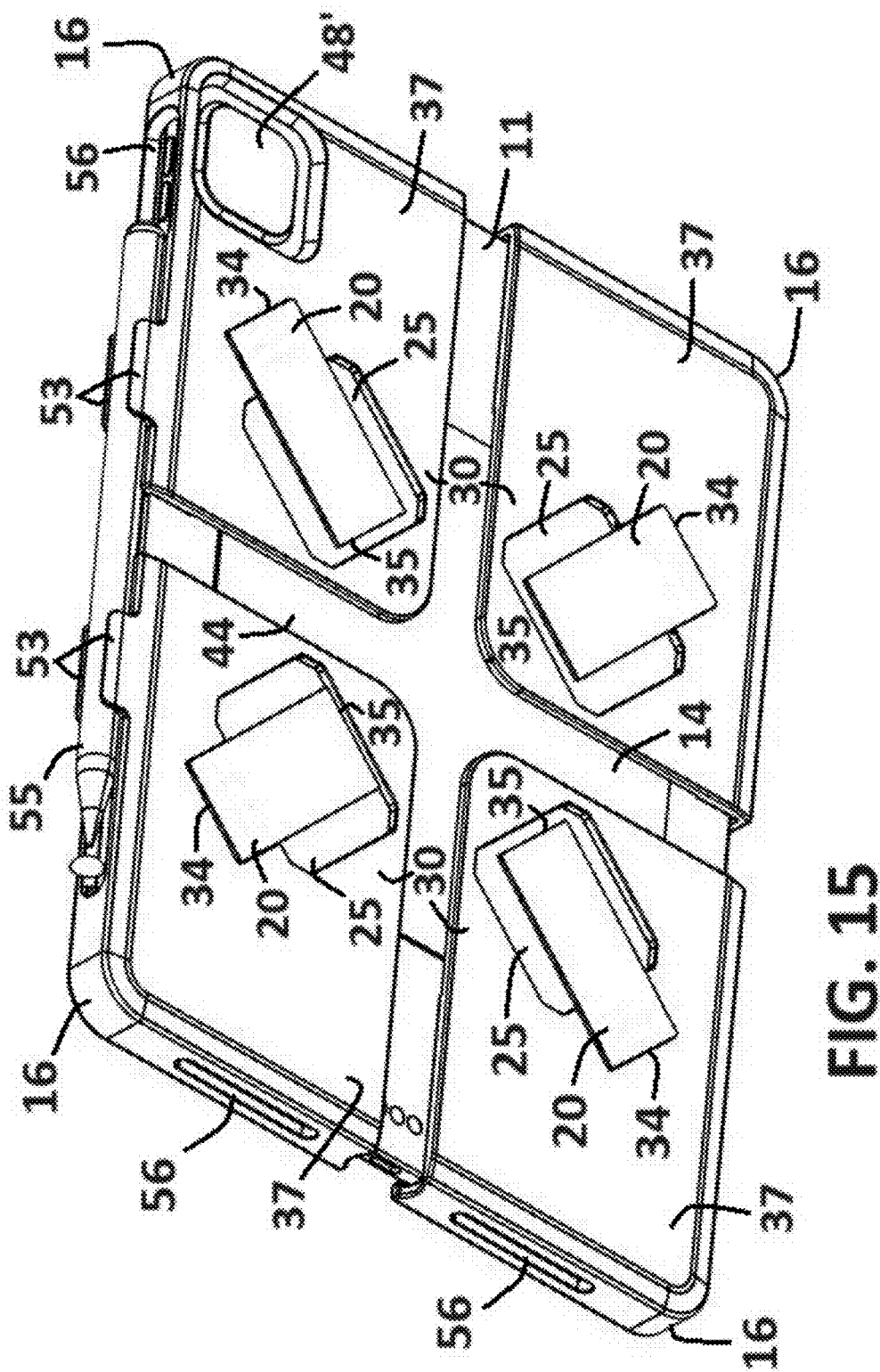
FIG. 15 is a posterior perspective view of the partial segmented cradle assembly otherwise shown in FIG. 14 depicted isometrically to alternatively show in alternative detail posterior features of the partial segmented cradle assembly.

In some embodiments, an elongate panel portion 47 of the posterior panel 15 may be attached to the outer folio assembly 13 at an attachment panel portion 46 of the outer folio assembly 13. In some embodiments, both the elongate panel portion 47 and the attachment panel portion 46 may comprise camera feature windows 48 for enabling camera lens exposure functionality of a mobile communications device 11 as cradled by the segmented cradle assembly 12. A select cradle segment 16 positioned at a select cradle corner may also comprise a camera feature window as at 48' in FIGS. 4, 14, and 15.

In some embodiments, the outer folio assembly 13 may further comprise a cavitied panel section 49 extending intermediate the attachment panel portion 46 and the support panel 24. The cavitied panel section 49, in some embodiments, is a panel accommodation folio portion or panel. The cavitied panel section 49 is pivotally attached to the attachment panel portion 46 and to the support panel 24 so that the various sections or panels of the outer folio assembly 13 can be pivoted relative to one another. The cavitied panel section 49 may, in some embodiments, comprise a panel-receiving cavity or depression as at 50 configured to receive a segment-anchoring posterior panel portion 51 of the posterior panel 15 when the outer folio assembly 13 is configured to encase or enclose the segmented cradle assembly 12. The panel-receiving cavity or depression 50 comprises a certain depth that corresponds to the thickness of the posterior panel 15 at least at the posterior panel portion 51 such that when the panel-receiving cavity 50 receives the posterior panel portion 51, the posterior panel portion 51 becomes substantially flush with a peripherally outer anterior surface 52 of the cavitied panel section 49.

The segmented cradle assembly 12 may further comprise certain other peripheral support features in some embodiments. For example, select device-holding cradle elements 16 may comprise stylus-holding formations 53 for selectively holding a stylus as at 55. Further, select device-holding cradle segments 16 may further comprise various apertures 56 configured to enhance or enable device functionality of the mobile communications device 11. In this regard, the reader is directed to FIGS. 8, 13, 15, 21, 24, and 25. Comparatively referencing these figures, it will be seen that the apertures 56 are configured so as to cooperate or become aligned with features of the mobile communications device 11 as cradled by the segmented cradle assembly 12. The apertures shown and referenced at 56 and the stylus-holding formations shown and referenced at 53 are exemplary features and should not be construed as liming.

Although the case assembly and segmented cradle assembly according to the presently disclosed subject matter have been described by reference to a number of different embodiments, aspects, and features, it is not intended that the case and cradle assembly be limited thereby, but that modifications thereof are intended to be included as falling within the broad scope and spirit of the foregoing disclosure, the appended drawings, and the following claims.

What is claimed is:

1. A case assembly for a mobile communications device, the case assembly comprising:

a segmented cradle assembly configured to adjustably cradle variously sized mobile communications devices, the segmented cradle assembly comprising an anterior panel, a posterior panel, and a plurality of device-holding cradle segments;

each device-holding cradle segment comprising a panel-opposing portion, a device-cradling portion, an outer anterior cradle surface and an inner anterior cradle surface;

the anterior panel being spaced from the posterior panel, the panel-opposing portions being sandwiched intermediate the anterior panel and the posterior panel and attached to the anterior panel and posterior panel by way of an elastic tether member;

the inner anterior cradle surfaces being offset from the outer anterior cradle surfaces such that the anterior panel extends into an offset space defined by each device-holding cradle segment, the anterior panel comprising an anterior panel surface, the anterior panel surface and the outer anterior cradle surfaces being coplanar;

the device-holding cradle segments being displaceable relative to the anterior panel and posterior panel and to one another via the elastic tether members for varying a distance between the device-holding cradle segments for adjustably receiving and cradling variously sized mobile communications devices.

2. The case assembly according to claim 1, wherein the device-holding cradle segments are displaceable relative to one another for adjusting at least one of a cradle length and a cradle width of the segmented cradle assembly.

3. The case assembly according to claim 2 comprising at least four device-holding cradle segments, the at least four device-holding cradle segments being positioned at four corner positions for respectively cradling four respective corners of a mobile communications device.

4. The case assembly according to claim 2 wherein the device-holding cradle segments are displaceable along displacement axes extending obliquely relative to the cradle length and the cradle width.

5. The case assembly according to claim 1, wherein at least two adjacent device-holding cradle segments are elastically tethered to one another for enhancing securement of said two adjacent device-holding cradle segments to the mobile communications device.

6. The case assembly according to claim 1, wherein the outer anterior cradle surfaces are grooved and the inner anterior cradle surfaces are smooth.

7. The case assembly according to claim 1, wherein the elastic tether members are anchored to the device-holding cradle segments such that anchor ends of the elastic tether members are flush posterior cradle surfaces of the device-holding cradle segments.

8. The case assembly according to claim 1 comprising an outer folio assembly for selectively encasing the segmented cradle assembly, the posterior panel being attached to the outer folio assembly at an attachment panel portion of the outer folio assembly.

9. The case assembly according to claim 8, wherein the outer folio assembly comprises a cavitied panel section in adjacency to the attachment panel portion, the cavitied panel section comprising a panel-receiving cavity configured to receive a posterior panel portion when the outer folio assembly encases the segmented cradle assembly.

10. A segmented cradle assembly for adjustably cradling variously sized mobile communications devices, the segmented cradle assembly comprising:

a centralized segment-anchoring arrangement and a plurality of device-holding cradle segments, each device-holding cradle segment comprising an arrangement-opposing portion, the arrangement-opposing portions being adjustably attached to the centralized segment-anchoring arrangement;

the centralized segment-anchoring arrangement comprising an anterior panel and a posterior panel, the anterior panel being spaced from the posterior panel, the arrangement-opposing portions being sandwiched intermediate the anterior panel and the posterior panel;

the arrangement-opposing portions being displaceable relative to the centralized segment-anchoring arrangement and to one another for adjusting a distance between the device-holding cradle segments for cradling variously sized mobile communications devices.

11. The segmented cradle assembly according to claim 10, wherein said device-holding cradle segments are elastically displaceable relative to one another for resiliently adjusting at least one of a cradle length and a cradle width of the segmented cradle assembly.

12. The segmented cradle assembly according to claim 11 comprising at least four device-holding cradle segments positioned at four corner positions for respectively cradling four respective corners of a mobile communications device.

13. The segmented cradle assembly according to claim 12, wherein said device-holding cradle segments are displaceable along displacement axes extending obliquely relative to the cradle length and the cradle width.

14. The segmented cradle assembly according to claim 13, wherein at least two adjacent device-holding cradle portions are elastically tethered to one another for enhancing securement of said two adjacent device-holding cradle segments to the mobile communications device.

15. The segmented cradle assembly according to claim 13, wherein the device-holding cradle segments each comprise an outer anterior cradle surface and an inner anterior cradle surface at the arrangement-opposing portion, the inner anterior cradle surfaces being offset from the outer anterior cradle surfaces such that the anterior panel extends into an offset space defined by each device-holding cradle segment.

16. The segmented cradle assembly according to claim 15, wherein the outer anterior cradle surfaces are grooved and the inner anterior cradle surfaces are smooth.

17. The segmented cradle assembly according to claim 15, wherein the anterior panel comprises an anterior panel surface, the anterior panel surface and the outer anterior cradle surfaces being coplanar.

* * * * *